United States Patent
Vaughan

(10) Patent No.: US 6,446,057 B1
(45) Date of Patent: Sep. 3, 2002

(54) METHOD AND APPARATUS FOR TRANSPARENT BACKTRACKING

(76) Inventor: Paul William Vaughan, 10502 Loring Dr., Austin, TX (US) 78710-9998

(*) Notice: Subject to any disclaimer, the term of this patent is extended or adjusted under 35 U.S.C. 154(b) by 27 days.

(21) Appl. No.: 09/730,481

(22) Filed: Dec. 4, 2000

Related U.S. Application Data

(63) Continuation of application No. 08/957,346, filed on Oct. 24, 1997, now Pat. No. 6,157,922.

(51) Int. Cl.$^7$ ................................................ G06N 1/00
(52) U.S. Cl. .............................. 706/46; 706/48; 706/58
(58) Field of Search ............................ 706/46, 48, 58; 717/5; 711/200; 716/1; 704/8

(56) References Cited

U.S. PATENT DOCUMENTS

| | | | | |
|---|---|---|---|---|
| 4,752,890 A | * | 6/1988 | Natajaran et al. | 706/58 |
| 4,754,410 A | | 6/1988 | Leech et al. | |
| 4,866,635 A | | 9/1989 | Kahn et al. | |
| 4,868,743 A | | 9/1989 | Nishio | |
| 4,914,590 A | * | 4/1990 | Loatman et al. | 704/8 |
| 5,119,470 A | * | 6/1992 | Highland et al. | 706/48 |
| 5,136,698 A | * | 8/1992 | Okamoto | 717/5 |
| 5,249,261 A | * | 9/1993 | Natajaran | 706/46 |
| 5,272,704 A | | 12/1993 | Tong et al. | |
| 5,274,821 A | | 12/1993 | Rouquie | |
| 5,276,775 A | | 1/1994 | Meng | |
| 5,307,445 A | | 4/1994 | Dalal et al. | |
| 5,386,520 A | * | 1/1995 | Gillet | 711/200 |
| 5,402,356 A | * | 3/1995 | Schaefer et al. | 716/1 |
| 5,422,980 A | | 6/1995 | Kurosawa et al. | |
| 5,546,507 A | | 8/1996 | Staub | |
| 5,862,519 A | * | 1/1999 | Sharma et al. | 704/231 |
| 6,157,922 A | * | 12/2000 | Vaughan | 706/46 |

OTHER PUBLICATIONS

L. Nigro, "Control Extensions in C++," Journal of Object-Oriented Programming (Feb. 1994), pp. 37–47.

A. Mueller, A. Zell, "Connectionist Natural Language Parsing with BrainC," Proceedings of the SPIE—The International Society for Optical Engineering (1991), col. 1469, pt. 1, pp. 188–196.

T. A. Budd, "Blending Imperative and Relational Programming," IEEE Software (Jan., 1991) pp. 58–65.

Inspect Online Search Report.

* cited by examiner

*Primary Examiner*—Wilbert L. Starks, Jr.

(57) ABSTRACT

A technique is used in embodiments of the invention such that backtracking programs can be written in a general purpose computer language (e.g., C++ or Java) without requiring the control structure of the program to reflect the structure of the decision tree. A data state and a control state are restored during backtracking. For restoring the data state, embodiments of the invention keep track of the changes made to variables and the point in execution at which the changes are made. When backtracking occurs, the data state can be restored by undoing the changes to the desired point in execution. For restoring the control state, the method of the invention provides a "failure" exception state that is invoked upon failure in the program (e.g., a failure to find a solution in a search program). The failure exception is "caught" by catch points established in the execution stack. The failure exception is passed up the execution stack until a point is reached prior to the failure at which execution should be re-initiated. Since the control structure of the search program need not have the same form as the decision tree, part of the control state for the desired decision point may no longer exist on the execution stack, so the catch point may not be directly associated with the desired point but merely preceed it. The remaining part of the control state is restored by re-executing the program in a special re-execution mode until the desired state is achieved and another alternative may be chosen.

19 Claims, 12 Drawing Sheets

METHOD AND APPARATUS FOR TRANSPARENT BACKTRACKING

This is a continuation of application Ser. No. 08/957,346 filed Oct. 24, 1997, now U.S. Pat. No. 6,157,922.

BACKGROUND OF THE INVENTION

1. Field of the Invention

This invention relates to backtracking-based searching, and in particular to transparent backtracking-based searching.

2. Background Art

Backtracking-based searching is a mechanism for solving complex problems having many potential alternative solutions. Rather than analyzing all possible alternatives prior to choosing a solution, a system using backtracking investigates one alternative at a time until an acceptable alternative is found.

In the prior art, special purpose logic-programming computer languages have been created that can be used to write a backtracking search program. Special purpose languages cannot take advantage of the tool sets that are typically available for general purpose programming languages. Further it is necessary for a developer to become proficient in the special purpose language (e.g., learn its syntax and programming strategies) before writing or developing a software application using the special purpose language.

One example of a special purpose programming language used for backtrack search applications is Prolog. Prolog operates on rules or clauses. Prolog attempts to match a first clause expressed in the rules with another clause that partially matches the first clause, or a literal statement of data. If multiple matches are found, Prolog chooses one of them. If the chosen alternative fails, Prolog backtracks to the point at which the failed match was chosen, and chooses another alternative.

Prolog has a built-in control flow capability that identifies matches, and arranges for backtracking when alternatives fail. Prolog organizes problems into a tree of "choice points", called a "decision tree". A choice point represents a point at which a decision must be made between a set of alternative selections. Each alternative represents a branch of the decision tree. At each choice point, Prolog chooses a branch, and explores that branch to determine whether it leads to an acceptable solution. If the chosen branch does not produce a solution, Prolog backtracks to the choice point and tries a different branch. As part of the backtracking process, before proceeding down a new branch, Prolog must restore the state of execution that existed at the choice point before the previously tried branch. That is, the data state (i.e. values of variables) and the control state (i.e. execution stack) must be restored to what they were before the previous branch was tried.

Another example of a special purpose language that is used to perform backtracking is described in T. A. Budd, "Blending Imperative and Relational Programming," *IEEE Software*, January 1991, pp. 58–65. The special purpose language, Leda, includes logic programming such as that provided by Prolog and procedural programming derived from Algol-like languages. Leda is a proprietary language that has its own syntax and programming restrictions. One such restriction requires that data types possess some value that indicates an "undefined" state which indicates that a value has not yet been assigned. All variables are undefined before the first use and cannot be used until defined without raising a runtime error.

The relational portion of Leda is fashioned after Prolog. Leda uses rules as in Prolog. The rules can contain calls to imperative functions. However, the imperative functions must return a Boolean value. Choice points are generated at run time based on the rules or a Suspend statement in Leda. A special compiler is needed to compile the Leda proprietary language.

Since Leda is a proprietary language, it does not provide a solution to the problem of implementing a backtracking mechanism using a general purpose language such as C++, for example. It is not possible to use the wide array of tool sets that are available for the general purpose languages.

L. Nigro, "Control Extensions in C++", *Journal of Object-Oriented Programming*, Febuary 1994, pp. 37–47 describes control extensions to C++ based on threads. Threads are control objects capable of independent execution. A thread is provided with features allowing temporary suspension and later resumption of its execution. A backtracking class is identified as a control extension of the thread class.

The backtracking class makes a copy of the computational state at a point in execution where a decision is made from among a list of alternatives (e.g., a choice point). In the process of choosing an alternative, a choice point is created and the computational state (i.e., data and execution state) is copied to a duplicate thread.

A failure method of the backtracking class is called to roll the execution state of the current thread back to the most recent choice point and return the next integer (representing the next alternative) in the sequence. To roll back the execution state, the duplicate thread is copied to the current thread.

Thus, in Nigro, the backtracking is performed by storing a copy of the entire execution stack and data state in the duplicate thread so that they can be restored during backtracking. This results in significant overhead due to the processing needed to copy the duplicate thread into the current thread, and due to the memory resources needed to store the duplicate thread. If backtracking is relatively infrequent, this overhead is wasted. Further, to dispose of the execution state of the failed alternative, Nigro's approach results in additional overhead since it is necessary to copy the duplicate thread back to the current thread. Nigro must perform a copy operation to transfer the archived execution state (i.e., the duplicate thread) to the current thread to dispose of the failed alternative's execution state.

Nigro's approach does not address resource allocation and deallocation. The duplicate thread assumes a certain state of resource allocation. When the duplicate thread is transferred to the current thread, unpredictable situations may occur due to a changed state of resource allocation. For example, memory is allocated to store a local string variable after which the duplicate thread is created. The current thread continues and the memory allocated to store a local string variable is released when the method in which the string variable is used terminates. When the current thread is recreated using the duplicate thread, the resource is no longer allocated. However, the restored thread assumes that the memory is still allocated for the local string variable. Use of the local string variable by the restored thread results in reading from unallocated memory which is likely to lead to an invalid execution state or an abnormal termination.

To implement backtracking in a general purpose language, current techniques encode logic for backtracking explicitly in the program which restricts the control flow of the search program. The backtracking logic can be encoded in a program using a recursive search engine that recursively calls itself to perform the search. Each call to itself represents a node, or choice point, on the search's decision tree.

The following is a pseudocode example of a recursive search routine. The search routine operates with a data state that includes an ordered list of steps or goals each of which must be satisfied for the search to be successful.

```
boolean search( )
{
    If there are no goals remaining, return true;
    ask the first goal for a set of alternatives
    for each such alternative
    {
        make the side-effects associated with the alternative
        if search( ), return true
        unmake the side-effects associated with the alternative
    }
    return false
}
```

There are many variations of a recursive technique for writing search programs with general purpose languages. However, each recursive search routine imposes a fundamental restriction on the structure of the search program. The problem domain of the search must necessarily be divided into goals each of which has a set of alternatives and a set of side-effects. As discussed below, one example of a side-effect is a subgoal of a complex goal.

One or more of the goals in the problem domain can be a complex goal which requires substeps at which there might be alternatives. To process a complex goal using a recursive search routine, it is necessary to express the complex goal as a set of substeps (or subgoals that represent each of the substeps). Each of the subgoals must post the next step as a separate goal in the ordered list of goals (e.g., the "make the side-effects . . . " posts the next step as a goal in the ordered list of goals). The recursive search routine that is called to process a subgoal must call itself to process the next subgoal in the ordered list of goals.

For example, a complex goal has subgoals A, B, and C. To process subgoal A of the complex goal, it is necessary for the recursive search routine to post subgoal B and call itself to process subgoal B. Similarly, to process subgoal B, it is necessary for the recursive search routine to post subgoal C and call itself to process subgoal C. As is the case with recursive calls, subgoal A's search routine call cannot complete (or returns) until subgoal B's search routine call returns, and subgoal C's search routine call must return before subgoal B's search routine call can return. Thus, the processing of each goal is not complete until the processing of each subsequent goal is completed or returns. A subgoal's alternatives must be exhausted or an alternative identified as a solution for the subgoal before the recursive search routine returns.

The recursive search techniques all share a common trait. The call structure of the overall program must reflect the structure of the decision tree. In the complex goal example, subgoals A, B, and C are choice points in a decision tree that includes a subgoal hierarchy such that A is a parent of B and a grandparent of C. The same hierarchy is reflected in the call sequence, or call structure, that processes subgoals A, B and C. That is, subgoal A's search routine calls subgoal B's search routine which calls subgoal C's search routine.

As discussed above, to backtrack to an alternative, a goal's recursive search routine cannot return until any subsequent goals' alternatives are exhausted or a solution is found for the subsequent goals. This is a direct reflection of the fact that the only mechanism available to a recursive search engine for reverting to a point in the call structure is to return to an active routine. While it is possible to perform isolated, independent sub-searches that return before the entire search is completed, it is impossible to backtrack to an untried alternative involved in such a search once the sub-search has completed. Thus, such a sub-search is only appropriate when no future goal could be affected by the manner in which the sub-goal was met.

SUMMARY OF THE INVENTION

A technique is used in embodiments of the invention such that backtracking programs (e.g., backtracking search programs) can be written in general purpose computer languages (e.g., C++ or Java) without imposing control flow limitations on the search program. A data state and a control state are restored during backtracking. For restoring the data state, embodiments of the invention keep track of the changes made to variables and the point in execution at which the changes are made.

When backtracking occurs, the data state can be restored by undoing the changes to the desired point in execution. For restoring the control state, the method of the invention provides a "failure" exception state that is invoked upon failure in the program (e.g., a failure to find a solution in a search program). The failure exception is "caught" by catch points established in the execution stack. The failure exception is passed up the execution stack until a point is reached prior to the failure at which execution can be re-initiated.

A backtracking search program identifies points in the execution at which a decision is made among one or more alternatives. An embodiment of the invention causes a choicePoint to be created at a decision point and identifies the alternatives associated with the decision point. A decision tree of choicePoints is generated that is traversed to identify a search solution. When a failure occurs in the program, a target choicePoint is identified that contains an available alternative (i.e., an untried alternative).

Data state changes are stored as Modifications, an object that contains a method to unmake the modifications made to the data state. Modifications are associated with choicePoints such that a choicePoint's Modifications can be undone.

A search stack comprises a linear representation of the current branch of the tree of choicePoints. An execution stack comprises the function call/return stack which is used to represent points of execution of the program. The execution stack includes catch points that are capable of catching a failure exception thrown by the program. Each catch point contains a correspondence to a choicePoint in the search stack and an index into the Modifications that hold the values of the variables assigned by the program.

When a failure occurs, a target choicePoint is identified and a failure exception is thrown to revert the data and control states to the target choicePoint. Reversion can be followed by re-execution, if the point at which execution is caught occurs prior to the point of execution associated with the target choicePoint.

Beginning with the current choicePoint, the search stack is traversed backwards to identify the target choicePoint. The target choicePoint is, in general, a choicePoint that still has untried choices. Usually, the most recent such choicePoint is designated as the target choicePoint, but it is possible that a choicePoint has been disabled. By disabling a choicePoint, it is possible to control the search and reduce backtracking. If a choicePoint is disabled, it is ignored as a candidate for the target choicePoint.

If a choicePoint is found not to be the target choicePoint, the Modifications associated with the choicePoint are undone. The search stack is traversed backwards to find the current choicePoint's previous choicePoint and the search for a target choicePoint continues.

When the failure exception is caught at a catch point, a determination is made whether the catch point's choicePoint is the target choicePoint or is prior to the target choicePoint. If not, a failure exception is thrown to traverse backwards through the execution stack. When the catch point that is associated or occurs prior to the target choicePoint is found, the target choicePoint's Modifications are undone. If the catch point occurs prior to the catch point associated with the target choicePoint, execution enters a re-execution mode to re-create the execution stack to reach the target choicePoint's execution point. An untried alternative is selected from the target choicePoint and normal execution continues.

During re-execution mode, the re-creation process is verified. Instead of re-creating a choicePoint, the choicePoint is compared to an existing choicePoint to verify that the alternatives are the same. Further, Modifications that are identified during the re-execution mode are compared to existing Modifications to verify that the Modifications that occur during re-execution are the same as the original Modifications.

Embodiments of the invention separate a search program into a model and a search engine. The model is a search procedure that is expressed in a programming language. The model includes functionality for generating decision points and causing a decision tree to be created. When the model generates a choicePoint, the search engine chooses the first untried choice and returns it to the model.

The search engine provides functionality for creating choicePoints and managing the backtracking process. The model makes a request of the engine to post the alternatives in a new choicePoint that represents the decision point and identifies the alternatives. The engine creates the choicePoint and inserts it at the end of the current branch in the decision tree. The engine returns the next alternative to the model.

The model continues processing at the current choicePoint by trying the choice returned by the engine. If that choice leads to a solution, the search is successful and ends. However, if an alternative fails, the engine reverts the data and execution state of the model to the target choicePoint or terminates the search if there is no such choicePoint remaining.

The model indicates the failure of a choice by calling a "fail" function of the engine. This transfers control to the engine. The fail function throws the failure exception causing the current execution state of the model to be aborted and initiating the backtracking process. When a failure is thrown, control transfers to the engine to revert the data and control states to the target choicePoint. If the point at which the engine backtracks is before the target choicePoint, the model enters re-execution mode.

In re-execution mode, execution by the model is verified to ensure that the re-execution parallels the original execution. A request by the model to record data state changes results in a comparison of the new data state changes with the data state changes stored in modifications. A request by the model to create a choicePoint results in a comparison of the new alternatives and the alternatives of the existing choicePoint. When the execution state reaches the target choicePoint, the engine exits re-execution mode and returns the next alternative. The model continues the search with the next alternative as though it had picked it instead of the failed alternative.

Backtracking is transparent in that the call structure of the program is separate from the decision tree. The model is concerned with generating the decision tree and testing individual alternatives without requiring complex control flow for dealing with failure or testing each alternative in succession. Instead, the model simply calls the fail function when it realizes that the combination of alternatives currently being considered cannot succeed. The engine maintains the ability to restore the call structure that is used by the model to perform the search. The engine includes a mechanism used to loop through the choices available at a choicePoint. When the model calls the fail function, the engine performs the backtracking. The model simply communicates the failure to the engine. During backtracking, the engine returns the control and data states to an appropriate point and supplies the model with the next alternative. The functionality provided by the engine is not incorporated in the model thereby reducing the complexity of the model and allowing the engine's functionality to be reused with other models.

DETAILED DESCRIPTION OF THE INVENTION

A method and apparatus for transparent backtracking is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the present invention comprise a method for using general purpose computer languages such as C++ to write backtracking programs. Embodiments of the invention create a choice point to mark a point in execution at which one or more alternatives have been identified and one is chosen to continue execution. If an alternative is later determined to be unsuitable, the program backtracks by restoring the data state and the control state of the program to the state associated with a choicePoint that has untried alternatives remaining and the search continues from that point. For restoring the data state, embodiments of the invention keep track of changes made to variables after each choice point, allowing the data state to be easily restored at each choice point.

For restoring the control state, embodiments of the invention provide a "failure" exception state that is invoked upon failure to find a solution along a branch. The failure exception is "caught" by catch points established in the execution stack that correspond to points in the execution stack that have not changed since some previous state of execution. The failure exception is passed up the stack until a point is reached prior to the last choice point. The system then reexecutes from the catch point to the target choice point, thereby restoring the state at the choice point.

Figure 1:
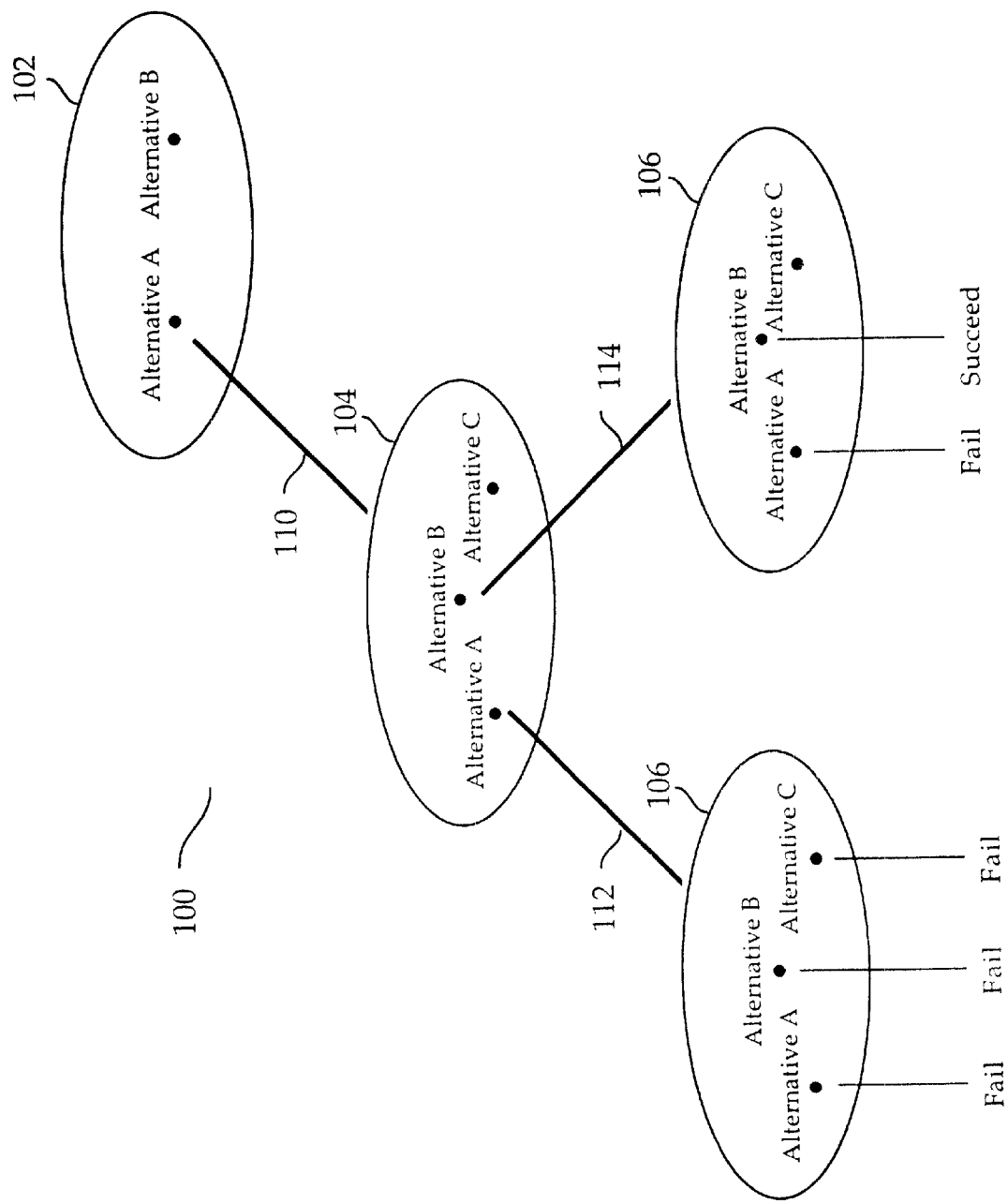
FIG. 1 provides an example of a choice point tree according to an embodiment of the invention.

FIG. 1 provides an example of a choice point tree according to an embodiment of the invention. ChoicePoint tree 100 includes choicePoints 102, 104, 106A, and 106B that represent a decision point. Each decision point or choicePoint represents a point at which alternatives have been identified. An alternative is considered to be available until it has been selected and tested to determine whether it is a viable alternative. An alternative is selected from the set of available alternatives and searching continues until another decision point is reached. A choicePoint is created at each decision point.

For example, choicePoint tree 100 can represent a decision process in the selection of options for an automobile. choicePoints 102, 104, 106 and 108 can be decision points encountered in selecting the specific options. choicePoint 102, for example, can represent a decision point for selecting an option package for the automobile. In this case, Alternatives A and B of choicePoint 102 can represent the deluxe and standard option packages, respectively.

Alternative A of choicePoint 102 is selected and searching continues until another decision point is reached (i.e., choicePoint 104). In the automobile selection example, choicePoint 104 can include alternative types of seat covers (i.e., Alternative A is cloth, Alternative B is leatherette, and Alternative C is leather). An alternative is selected at choicePoint 104 (e.g., cloth seats or Alternative A).

At each decision point, an alternative can create a failure. When a failure occurs, the decision process reverts to a point prior to the failure, another available alternative is selected and searching continues with the new alternative. To revert the decision process, the data and control state must be reverted. For example, when choicePoint 106A is reached, Alternative A is selected. It is possible that Alternative A is not valid given the prior selections. In this case, the selection process backtracks to a choicePoint at which another alternative is available for selection, i.e., a target choicePoint.

In the automobile selection example, Alternatives A, B, and C represent options (e.g., CD changer, air conditioning, and electric seats) that are not available with cloth seats (i.e., Alternative A of choicePoint 104) in the deluxe options package (i.e., Alternative A of choicePoint 102).

When Alternative A of choicePoint 106A is selected, searching continues and it is determined that Alternative A is not a valid alternative. The search process backtracks to a target choicePoint that contains an untried alternative. choicePoint 104 is a target choicePoint, since it has two untried alternatives (i.e., Alternatives B and C). The data state maintained during the search process could have been altered as a result of selection of Alternative A of choice point 106A. These modifications to the data state are undone before forward searching commences with another alternative. Instead of deleting the modifications after they are undone, the data state modifications can be retained and used to verify the data state re-execution mode which is described more fully later.

Alternatives B and C of choicePoint 106A are tried and fail. Since choicePoint 106A has no untried alternatives, it is no longer the target choicePoint. choicePoint 104 has two untried alternatives (Alternatives B and C) and becomes the target choicePoint. The data state is restored to just prior to the selection of Alternative A of choicePoint 104. Alternative B of choicePoint 104 (i.e., leatherette seat covers) is selected and execution continues to choicePoint 106B. In this example, it is assumed that air conditioning (Alternative B of choicePoint 106B) is available, but a CD changer (Alternative A of choicePoint 106B) is not available with leatherette seat covers (Alternative B of choicePoint 104) and the deluxe option package. After Alternative A is selected and fails, Alternative B is selected and succeeds.

Search and Execution Stacks

During the searching process, a search stack is maintained that includes choicePoints. The search stack is a linear representation of the current branch in the tree of choicePoints. Referring to FIG. 1, choicePoint tree 100 illustrates examples of branches in a tree of choicePoints. One example of a branch includes links 110 and 112. Link 110 connects choicePoints 102 and 104. Link 112 connects choicePoints 104 and 106A.

In one embodiment of the invention, a choicePoint is implemented as an object class having methods and instance variables. Linkages between choicePoints can be implemented as instance variables. For example, link 110 can be implemented using "previous" and "next" instance variables. For choicePoint 104, for example, the "previous" and "next" instance variables reference choicePoints 102 and 106A, respectively. The "next" instance variable for choicePoint 102 references choicePoint 104. The "previous" instance variable of choicePoint 106A references choicePoint 104.

Information representing a point of execution is referred to as the control state. An example of a point of execution is the instruction that is currently being executed, or to be executed upon re-entry into the function. Some or all of the control state is stored in an execution stack (e.g., function call/return stack in C++).

Figure 2:
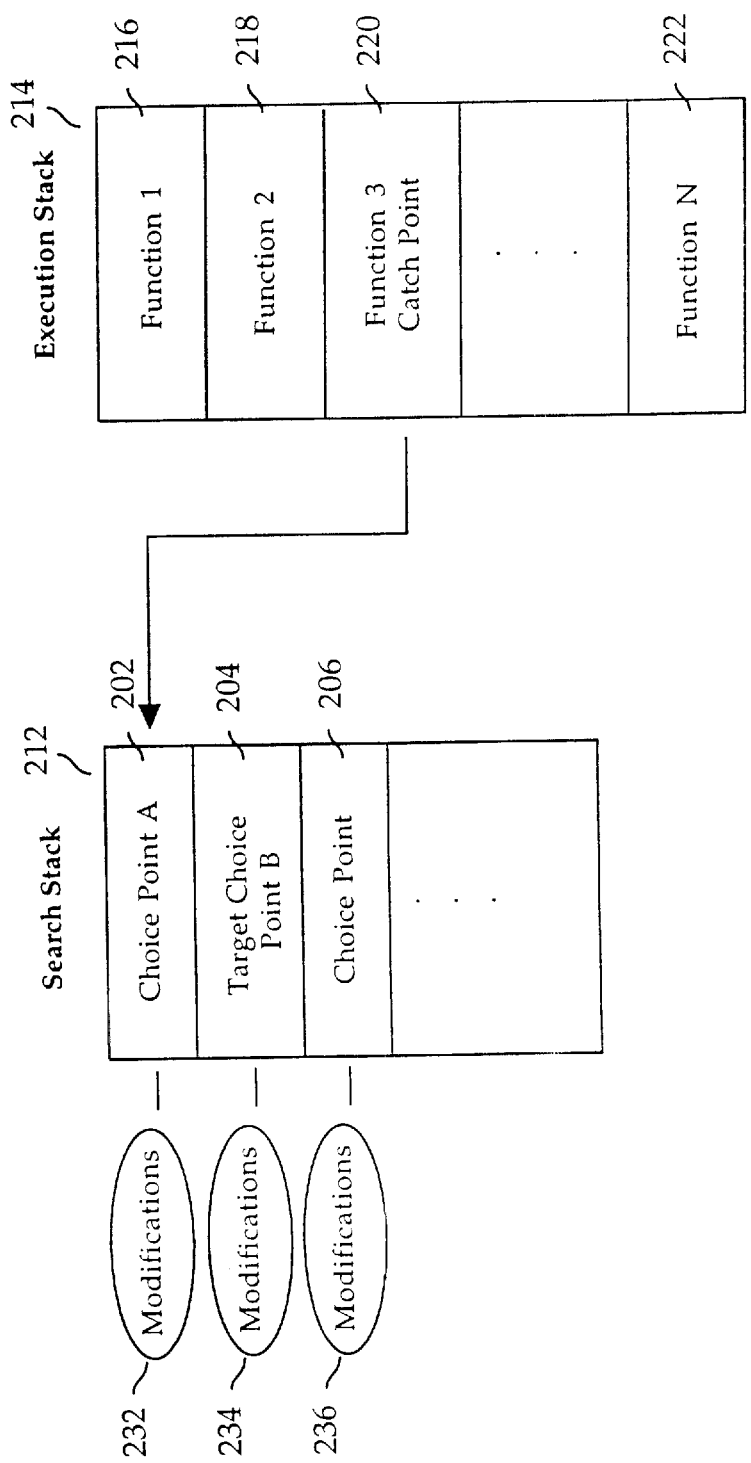
FIG. 2 illustrates a representation of the search stack comprised of choicePoints and an execution stack according to an embodiment of the invention.

FIG. 2 illustrates a representation of the search stack comprised of choicePoints and an execution stack according to an embodiment of the invention. Search stack 212 contains entries 202, 204 and 206A that correspond to choicePoints 102, 104, and 106A, respectively.

Execution stack 214 includes entries that contain execution information (e.g., function call/return information). For example, entries 216, 218, 220 and 222 contain information regarding functions that have been invoked during execution. Execution stack 214 further contains information associated with a catch point. A catch point is a point of execution restored by throwing and catching a "failure" exception. A catch point contains a pointer to a previous choicePoint and an index to the current modifications.

Each choicePoint can be associated with a list of modifications made to the data state. For example, entry 202 (i.e., choicePoint 102) is associated with Modifications 236. In one embodiment of the invention, Modification 236 is an object that includes functionality to make and unmake changes to the data state. As the search proceeds, Modifications are produced to make changes to the data state whenever, for example, a variable is changed. This can be accomplished, for example, by explicitly creating the modification or by using data structures whose manipulators or assignment operators implicitly create Modifications, for example. C++ templates can be used for adapting various data structures, for example. When it is time to backtrack, the state is restored incrementally by unmaking the modifications until the desired data state corresponding to the catch point.

Backtracking

When a failure occurs, searching is backtracked which includes restoring the state of execution (i.e., the data state and the control state). The data state comprises the values of all variables in the, program. If a choice point must be revisited, all variables of the model must be restored to have the values they had before an associated choice was made. During backtracking, the execution state is restored such that processing can continue with a new alternative.

Changes to the data state are made such that the data state can be restored incrementally. Incremental changes that occur after the backtracking point can be undone by invoking an "unmake" method of each Modification associated with a choicePoint that occurred after the catch point. For example, values assigned in the data state are assigned to instance variables of Modifications that can be unmade to restore the data state and return to the backtracking point.

The execution stack is used to backtrack to a point in the control state. Further, embodiments of the invention can recompute some portion of the control state based on the original or previous, unchanged input. It is, therefore, unnecessary to make copies of the execution stack to be able to restore the execution state. Invoking functions does not change the underlying portion of the execution stack (i.e., the entries that have already been pushed onto the stack) with the possible exception of local variables that are embedded in the control stack. Changes to these local variables can be handled as part of the data state with the modification mechanism. The modification mechanism is adapted to record when a local variable ceases to exist. For example, a local variable ceases to exist when the subroutine in which the local variable is created terminates.

The system can therefore store some of the control state in memory recognizing what part of the execution stack has not changed. During backtracking, the changed portion of the control state is popped off the execution stack while the unchanged portion remains on the execution stack.

The system employs exceptions to restore the execution stack to the common state. The point of execution at which the exception is caught is known as the catch point. A catch point need not correspond directly to a choicePoint, but occurs prior to reaching the target choicePoint. Catch points can be established explicitly, or implicitly whenever an alternative is chosen.

Referring to FIG. 2, execution stack 214 contains entries for functions called during execution. Entry 220 represents a call to a function that contains a catch point. According to search stack 212, choicePoint 106A (represented by entry 206A) is the current choicePoint. After Alternatives A, B, and C of choicePoint 106A are tested, a failure exception is thrown. When the failure exception is thrown, it is caught by a catch point on execution stack 214. The failure exception is caught by the catch point in the function represented in entry 220 of execution stack 214. A determination is made whether the catch point occurred prior to the target choicePoint. If not, the failure exception can be passed up through the catch points in the execution stack to locate a catch point that occurred prior to the target choicePoint. The functions stored on execution stack 214 that are passed over to get to a catch point are removed from the stack. Thus, by throwing the exception, the control state can be restored to some state that occurred prior to the target choice point.

The data state can be restored at the time that the control state is being restored. A catch point embeds an index that identifies the modifications that occurred after the catch point. Thus, modifications that occurred after the catch point can be undone.

Rerunning

It is possible that a catch point occurred prior to a target choicePoint. Therefore, the target choice point may have been created by function calls that are no longer on the execution stack. Thus, it might be necessary to recompute the control state to arrive at an execution position where the target choicePoint's next alternative can be tested. By reverting the data state and control state to the catch point, the model can be run again until it reaches the target choicePoint.

The data state is reverted by undoing the data state changes that have been saved incrementally as Modifications. The search stack is popped from the point of failure to the catch point. Execution flow is commenced from the catch point to reach the target choicePoint's execution point causing the re-creation of the data state changes and choicePoints that occurred after the catch point. During re-execution, the regenerated choicePoints can be compared with the existing choicePoints in the search stack and data state changes stored in their associated Modifications to verify re-execution.

Starting with the catch point's associated choicePoint, execution advances through the choicePoints in the search stack to recreate choicePoints until the target choicePoint is reached. choicePoints are not added to search stack 212. Instead, a test is performed to determine whether the recreated choicePoints correspond to the existing choicePoints. When the target choicePoint is reached, execution reverts to normal mode, the next untried alternative of the target choicePoint is selected and normal execution proceeds.

During re-execution, computationally intensive operations may need to be recomputed. To avoid repeating time-consuming computations, the result of the computation and the Modification index present at the end of the computation can be recorded in the Search Stack. In re-execution mode, instead of performing the computation the recorded result of the computation can be used. This optimization is requested explicitly by the model.

The comparison process that is used during re-execution can help recognize when a variation exists between the original and re-created states. During the comparison process, Modifications and choicePoints produced during re-execution are compared with the Modifications and choicePoints that were originally produced. If the data and control states are recorded properly during the original execution, re-execution should be able to re-create the data and control states. It is possible that the data or control states created during re-execution may differ from the original data and control states. The following sequence provides an example in which the original data state is not recorded during execution resulting in an inability to re-create the data state:

1) create a variable and give it a value,;
2) establish a catch point;
3) make a decision based on the value of that variable;
4) establish a choicePoint;
5) change the value of that variable without making a Modification;
6) alternative fails and the failure exception is caught prior to the target choicePoint.

Since the failure is caught prior to the target choicePoint, re-execution is performed to re-create the data and control states to the target choicePoint. However, since the data state change that occurred in step 5 was not stored incrementally (i.e., using a modification), the data state is not restored correctly. That is, re-execution will commence at the catch point without restoring the original value of the variable modified in step 5. Re-execution might take a different path and never recreate the choicePoint in step 4. This could lead to unwanted outcomes.

If a discrepancy is found, execution can be terminated or a message can be generated to warn of the discrepancy, for example.

Search Program

Embodiments of the invention are used to implement a searching capability that generates a search space during execution. The search space includes a decision tree (e.g., a tree of choice points) that is created dynamically and is traversed during execution of the search program. The decision tree represents decisions that are made during execution of the search program. The tools provided by the invention incorporate the ability to backtrack to a decision point in a search program written in a general purpose programming language.

Embodiments of the invention separate a search program into a model, a search engine, and mechanisms for input and output. The model is a search procedure that is expressed in a programming language. The model recognizes choicePoints and determines the viability of alternatives. The search engine provides functionality for creating choicePoints and managing the backtracking process.

Figure 3:
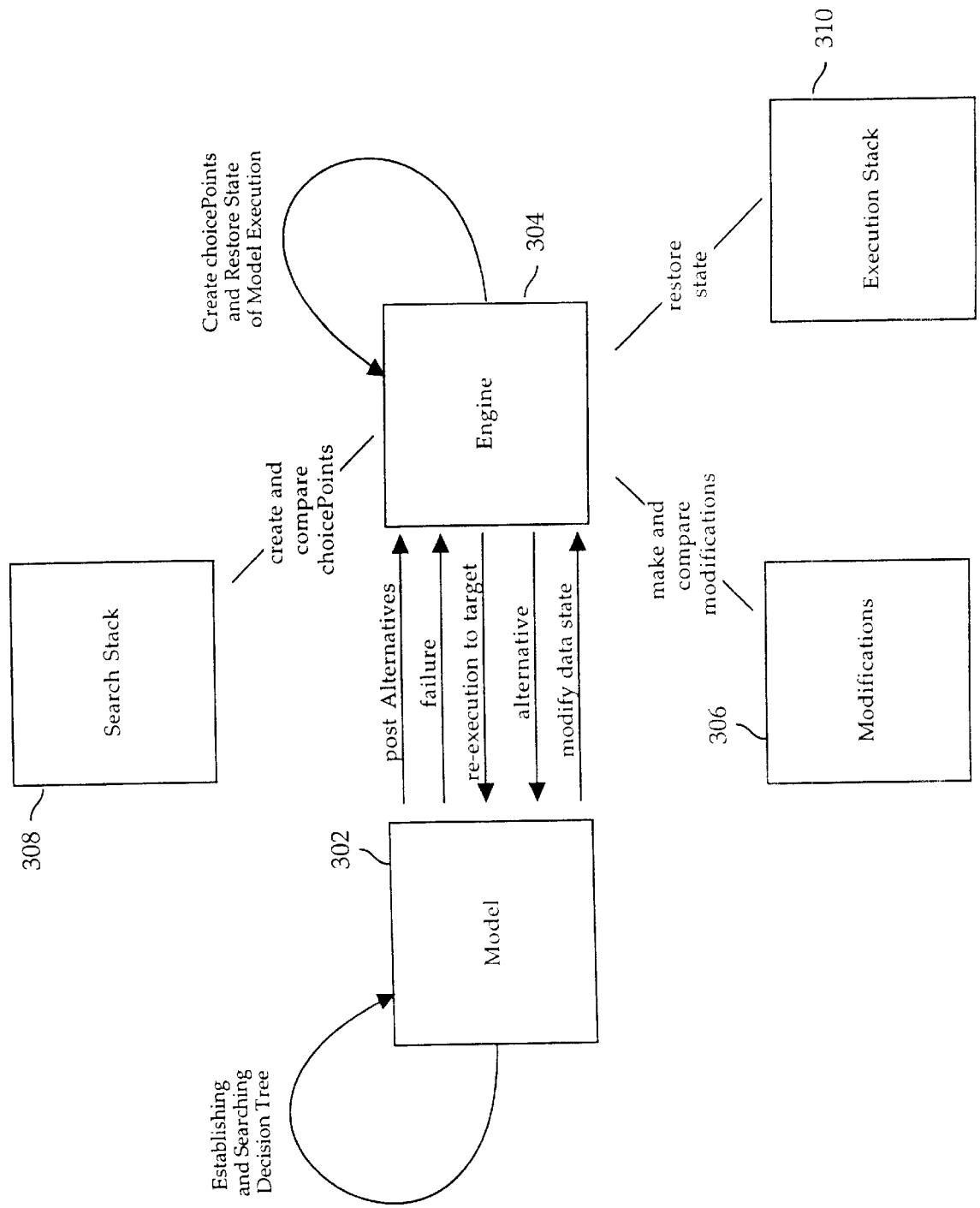
FIG. 3 illustrates the components of a search program according to an embodiment of the invention.

FIG. 3 illustrates the components of a search program according to an embodiment of the invention. Model 302 contains functionality for recognizing decision points and causing a decision tree to be created which Model 302 searches to identify a viable solution for the search. During searching, when Model 302 encounters a decision point with one or more alternatives, Model 302 makes a request of Engine 304 to post the alternatives in a new choicePoint that represents the decision point and identifies the alternatives. Engine 304 creates the choicePoint in search stack 308 and inserts it at the end of the current branch in the decision tree. Engine 304 returns an alternative to Model 302.

Model 302 continues processing at the current choicePoint by trying each alternative until one of the alternatives is successful. When an alternative fails, Model 302 can request the next alternative from Engine 304. If all of the alternatives are tried and none are successful, a failure is thrown. Model 302 records data state changes in Modifications 306. Typically, it is not necessary to record changes to local variables (i.e., variables that are local to a function or method). Model 302 records changes to global data such as data relating to a selection made during processing.

When a failure is thrown, control transfers to Engine 304 to revert the data and control states to the target choicePoint. The control state is stored in execution stack 310. Engine 304 reverts the control and data states. If the point at which Engine 304 backtracks is before the target choicePoint, Engine 304 invokes a re-execution mechanism in which Model 302 regenerates the necessary portions of the control and data states. The regenerated control and data states are maintained in execution stack 310 and Modifications 306, respectively.

In re-execution mode, execution by Model 302 is verified to ensure that the re-execution mimics the original execution. Thus, a request by Model 302 to record data state changes results in a comparison of the new data state changes with the data state changes stored in modifications 306. Further, a request by Model 302 to create a choicePoint results in a comparison of the new alternatives and the alternatives of the existing choicePoint stored in search stack 308. When the execution state reaches the forward re-execution point, Engine 304 transfers control to Model 302 to continue searching with the next alternative of the target choicePoint by Engine 304.

Backtracking is transparent to Model 302. The call structure stored in execution stack 310 is separate from the decision tree that is maintained in search stack 308. Engine 304 maintains the call structure that is used by Model 302 to perform the search. Model 302 specifies the structure of the decision tree. Model 302 makes a request of Engine 304 to create a choicePoint that is stored in search stack 308. Engine 304 includes a mechanism used to loop through the alternatives available at a choicePoint. Model 302 merely requests the next alternative. Model 302 validates a search alternative returned by Engine 304.

When a failure occurs that requires backtracking, Model 302 communicates the failure to Engine 304 which performs the backtracking, as needed. During backtracking, Engine 304 returns the control and data states stored in execution stack 310 and Modifications 306 (respectively) to an appropriate point and supplies Model 302 with the next alternative. The next alternative may be a previously-processed alternative that is being revisited during forward re-execution, or a new alternative. Model 302 is unaware of the backtracking mechanism. The functionality of Model 302 and Engine 304 can be separate thereby reducing the complexity of Model 302. Further, the functionality provided by Engine 304 can be reused with other models.

Search Program Embodiment

An embodiment of the invention can be incorporated into a search program to configure a computer system. Model 302 includes functionality to determine the viability of alternative configurations for the computer system. Model 302 defines possible components for the computer system and the requirements for including a component in the computer system. For example, if Model 302 can be used to determine the viability of a disk drive (i.e., a hard disk drive) installation in a computer system. Model 302 includes functionality to identify the requirements for installing a disk. These requirements can be expressed in C++ as follows:

```
void DiskInstance::install( )
{
  BayInstance* s=requires(Bay, "Get a Bay", Existing,
    noFilter, noSort);
  PowerSupplyInstance* ps=requires(PowerSupply,
    Power, 3.0, "Get disk power", Existing, noFilter,
    noSort);
```

```
ControllerInstance* c=requires(Controller, "Get a
    Controller", Either, noFilter, noSort);
}
void ControllerInstance::install( )
{
    SlotInstance* s=requires(Slot, SlotAvailable, 1, "Get a
        Slot", this, Controller→slotAttr, Existing, noFilter,
        noSort);
    PowerSupplyInstance* ps=requires(PowerSupply,
        Power, powerRequired( ), "Get card power",
        Existing, noFilter, noSort);
}
```

The preceding code indicates that installation of a disk requires a bay (i.e., a slot in which the disk drive can be inserted), power supply, and a controller card. A controller card requires a slot and power supply. It is assumed, for the sake of this example, that a cabinet has already been installed that has four bays, a 5 unit power supply, and two slots in which a card can be installed.

Model 302 begins the installation by, for example, executing the "requires" steps in the DiskInstance::Install method. Since the cabinet previously installed has four bays, there are four alternatives for a bay. A choicePoint is created to represent the decision point at which a bay is chosen to perform the "requires" step for the bay. A choicePoint is also created for the "requires" power and controller steps. Model 302 invokes a method of Engine 304 that provides an available alternative to Model 302 until one alternative succeeds or there are no more alternatives.

Figure 4A:
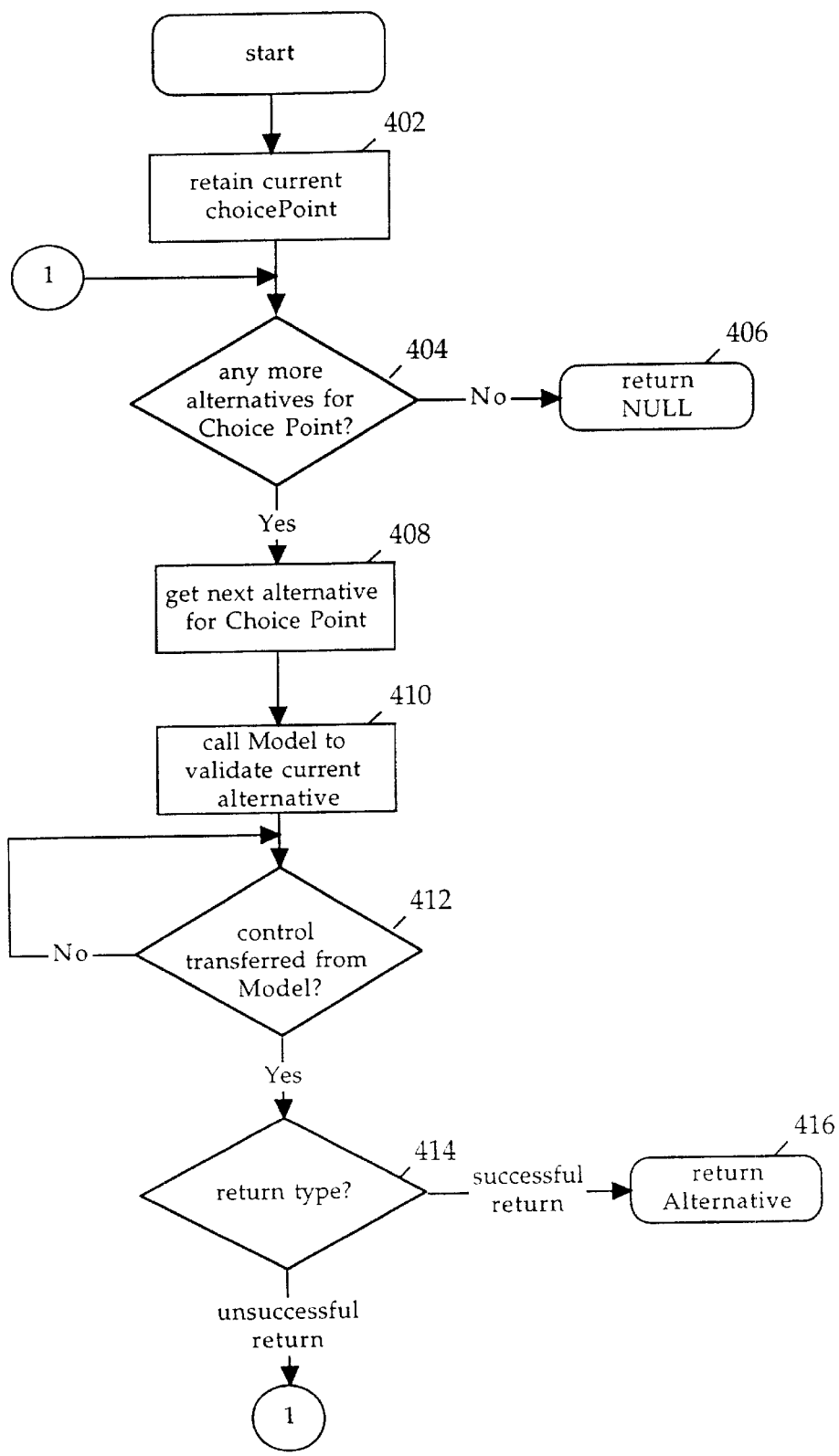
FIG. 4A provides a process flow for saving and processing a choicePoint according to an embodiment of the invention.

FIG. 4A provides a process flow for saving and processing choicePoints according to an embodiment of the invention. Sample code (i.e., the "plan" method) that implements the process flow is provided in a subsequent section. In this embodiment, each alternative is a goal. If a goal succeeds, it is returned to the routine that established the choicePoint. The flow ends by either returning a valid alternative, or a code (e.g., "NULL") that indicates that a valid alternative was not found.

The flow is called to initiate searching and as part of the processing of each choicePoint. Note that a new choicePoint can be created while processing the current choicePoint. Thus, at step 402, the current choicePoint is stored as a local variable in this method. The current choicePoint local variable can be accessed to identify the choicePoint. It can be used to identify the choicePoint to which execution can revert, if a failure is thrown, for example. At step 404 (i.e., any more alternatives for current choicePoint?), a determination is made whether all of the current choicePoint's alternatives have been tried. If so, processing returns without a viable alternative at step 406.

If there is an untried alternative, processing continues at step 408 by Engine 304 to select an alternative. Processing continues at step 410 to invoke a validation routine of Model 302 to validate the current alternative. At step 412 (i.e., "control transferred from Model?"), a determination is made whether Model 302 is transferring control of execution back to Engine 304. In the embodiment, Engine 304 executes in the same process as Model 302. Engine 304 makes a call to Model 302 to validate the current alternative. Model 302 can return to Engine 304 either by a simple return or by throwing a failure exception.

If Model 302 transfers control to Engine 304, processing continues at step 414 to process information received from Model 302 in the transfer. For example, Model 302 can return a code indicating success or failure of the alternative, or can throw a failure exception. If Model 302 returns a success code to indicate that it successfully processed the alternative, processing returns to the calling procedure along with the successful alternative at step 416. If Model 302 returns an unsuccessful code or throws a failure exception, processing continues at step 404 to determine whether there are any untried alternatives.

In this embodiment, the return of an unsuccessful code from Model 302 indicates that the alternative has failed in a trivial way that does not require backtracking. That is, it indicates that Model 302 did not modify any variables or establish additional choicePoints during the validation of the alternative. It is not necessary to call a failure exception in this case. If the processing of the alternative is not trivial, the validation routine from Model 302 throws a failure exception.

Different validation routines can be used by Model 302. A validation routine reflects the type of search being performed. For example, the search may involve determining a configuration for a system. In this case, one validation routine of Model 302 can be used to instantiate a component of the system. Model 302 determines whether the component can be installed and returns true, if the installation is successful. Another validation may involve Model 302 choosing a component from a set of components that already exist in the system. In this case, Model 302 chooses an existing component and returns true.

A validation routine of Model 302 need not perform a complete validation. While it is often convenient to validate all of the aspects of an alternative at one time, it is not required. Unlike a recursive approach, Model 302 need not be structured such that all of the remaining search that might be influenced by this alternative be performed within the scope of the validation routine. That is, after Model 302 can validate an alternative in one portion of the search, and determine in another, independent portion of the search that some aspect of the decision process that led to the selection of the validated alternative was not correct or appropriate. In this case, Model 302 throws a failure exception that causes Engine 304 to revert the control and data states to a point prior to the selection of the validated alternative. Model 302 continues its search which may cause an alternative other than the validated alternative to be selected.

Figure 4B:
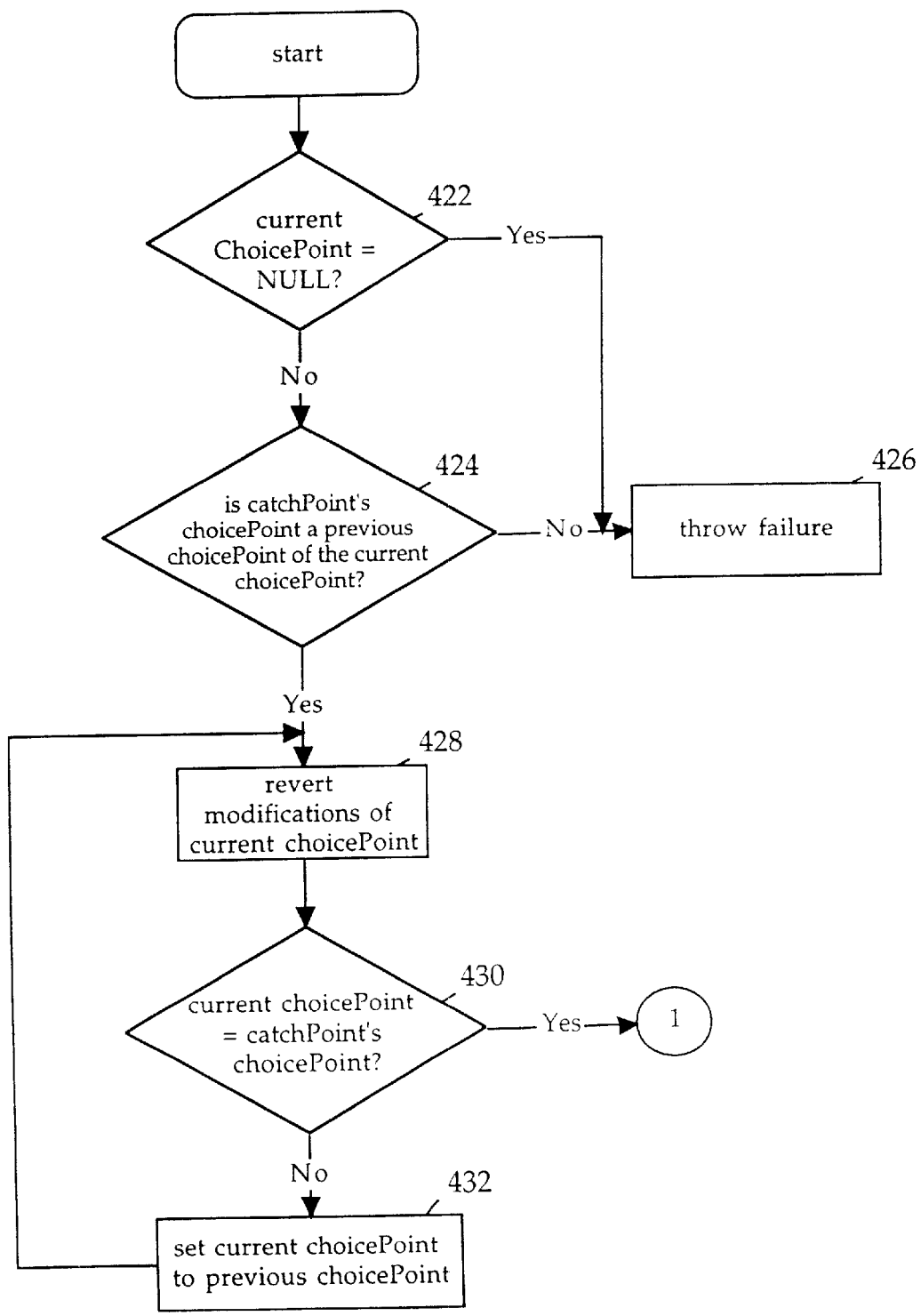
FIG. 4B provides a process flow for handling a failure exception according to an embodiment of the invention.

A failure exception thrown by Model 302 can be caught by Engine 304. FIG. 4B provides a process flow for catching a failure exception according to an embodiment of the invention. The section entitled "Embodiments of Plan Method with Catch Block" provides a sample catch block that implements the process flow of FIG. 4B.

The steps of FIG. 4B are implemented as a catch block that can catch a failure exception thrown by Model 302. At step 422 (i.e., "current choicePoint=NULL?"), a determination is made whether the current choicePoint needs to be reverted (e.g., Modifications need to be undone). If not, processing continues at step 426 to throw a failure exception that can be caught by another function on the execution stack. If the current choicePoint is not null, processing continues at step 424.

At step 402 of FIG. 4A, the current choicePoint was stored for this catch point. At step 424 of FIG. 4B (i.e., "is catchPoint's choicePoint a previous choicePoint of the current choicePoint?") a determination is made whether the catch point's choicePoint is along the same branch of the decision tree as the current choicePoint. If not, processing continues at step 426 to throw a failure exception. If so, processing continues at step 428 to revert the modifications made at the current choicePoint.

At step 430 (i.e., "current choicePoint=catchPoint's choicePoint?"), a determination is made whether the reversion process has reached the choicePoint associated with this choicePoint. If so, processing continues at step 408 to continue processing with an untried alternative of the current choicePoint. If not, processing continues at step 432 to identify the previous choicePoint associated with the current choicePoint as the current choicePoint. Processing continues at step 428 to revert the current choicePoint. Processing continues at step 430 to backtrack through the search stack until the catch point's choicePoint is reached.

Figure 5:
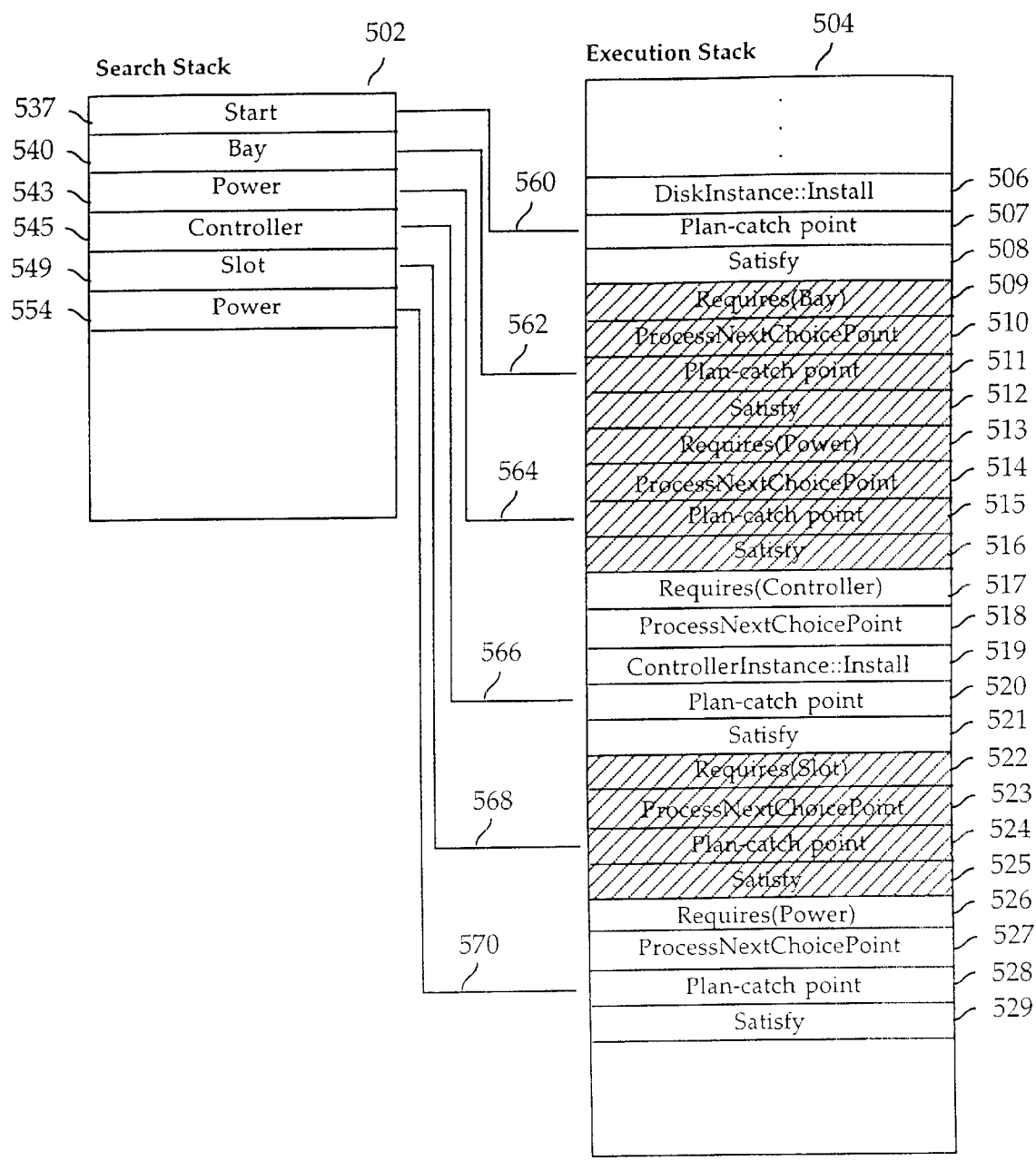
FIG. 5 provides an example of the search and execution stacks for the configuration example according to an embodiment of the invention.

The catch point is determined by the contents of the execution stack. The execution stack identifies a function that has been invoked during processing but has not yet returned to its calling program. FIG. 5 provides an example of the search and execution stacks for the configuration example according to an embodiment of the invention. The functionality represented in FIGS. 4A–4B are referred to in FIG. 5 as "Plan".

Model 302 invokes the DiskInstance::Install function to install the disk drive represented as entry 506 of Execution stack 504. Model 302 invokes Engine 304 by invoking the plan function (represented as entry 507 in execution stack 504). The plan function identifies an alternative and invokes the satisfy function (entry 508 of execution stack 504). The satisfy function has the functionality to process a request (e.g., install disk drive) to determine whether it can be satisfied with the current alternative. In this example, the satisfy function invokes the requires steps of DiskInstance::Install. A requires function of Model 304 satisfies the requirements associated with the disk drive installation (e.g., bay, power, and controller requirements).

Model 304 causes choicePoints to be created when the requires function-is processed. The first requires step in DiskInstance::Install indicates that a bay is required to install the disk drive. The requires function is called to satisfy the bay requirement (entry 509 of execution stack 504). The requires function determines that there are four alternatives for bays. Model 302 requests Engine 304 to create a choicePoint (entry 540 of search stack 502) to represent the decision for bays.

Model 302 calls ProcessNextChoicePoint (entry. 510 of execution stack 504). The processNextChoicePoint (see the subsequent section for sample code and FIG. 6) function sets .the current choicePoint as the bay choicePoint (entry 540 of search stack 502) and invokes another occurrence of the plan function (entry 511 of execution stack 504) to manage the processing of the bay alternatives. This occurrence of the plan function stores a pointer (pointer 560) to the bay choicePoint (entry 540 of search stack 502).

Control is transferred to Model 302 with the first bay alternative via the invocation of the satisfy function (entry 512 of execution stack 504). This occurrence of satisfy determines that the alternative passed by Engine 304 is viable, and a success code is returned to the calling program (i.e., the occurrence of plan represented in entry 511). The return pops entry 512 from the stack. The occurrence of plan that called the returning routine (i.e., entry 511) returns a successful code and entry 511 is removed from execution stack 504. Because the requirement for a bay is satisfied, entries 510 and 509 (i.e., requires and processNextChoicePoint) return and are popped off the stack.

A bay is being consumed for use with the disk drive as a result of this processing. The use of a bay changes the state of the computer system in which the disk drive is being installed. Therefore, this information is not merely a local variable and affects the overall searching process. It is stored as a Modification associated with the bay choicePoint (entry 540 of search stack 502). Model 302 invokes a "modify" method of Engine 304 to save this incremental change.

The requirement for power for the disk drive is processed. Like the bay requirement, processing causes the requires, processNextChoicePoint, plan and satisfy functions to be invoked (represented by entries 513–516). The occurrence of requires causes the power choicePoint (entry 543 of search stack 502) to be created. The occurrence of plan stores a pointer (pointer 562) to the power choicePoint (entry 543). When it is determined that the power requirement for the disk drive is satisfied, processing returns and entries 513–516 are popped off execution stack 504. In this example, it is assumed that the disk drive consumes 3 units of power of the 5 unit power supply. Model 302 invokes the "modify" method of Engine 304 to incrementally save this change to the configuration (i.e., consumption of 3 units of the power supply).

The controller requirement is processed by invoking the requires function (entry 517 of execution stack 504) which creates the controller choicePoint (entry 545 of search stack 502), and invokes the processNextChoicePoint and ControllerInstance::Install functions (entries 518 and 519 of execution stack 504). Another occurrence of the plan function is invoked (entry 520 of execution stack 504) which stores pointer 566 to the controller choicePoint (entry 545 of search stack 502) and transfers control to Model 302 with the first controller alternative via the satisfy function (entry 521 of execution stack 504).

Since the controller card requires a slot, the requires function (entry 522 of execution stack 504) is called by Model 302 which creates the slot choicePoint (entry 549 of search stack 502). ProcessNextChoicePoint (entry 523) is invoked which calls the plan function (entry 524) and pointer 568 is created to associate the plan function with the slot choicePoint (entry 549 of search stack 502). A slot alternative is selected and the satisfy function (entry 521 of execution stack 504) is invoked. The slot alternative is determined to be viable by Model 302. Model 302 requests Engine 304 to incrementally save the consumption of the slot in a Modification. The satisfy, plan, processNextChoicePoint and requires invocations (entries 522–525) end successfully and are popped off execution stack 504.

The controller card requires power. It is assumed, for this example, that the controller card alternative that is being tested requires 3 units of power. Entries 526–529 are created on execution stack 504 to process the power requirement for the controller card alternative installed in the computer system. The requires function (entry 526) creates the power choicePoint (entry 552 of search stack 502), processNextChoicePoint calls the plan function (entry 523) which creates pointer 570 to the power choicePoint (entry 554 of search stack 502) and calls the satisfy function (entry 529 of execution stack 504).

In processing the satisfy function, Model 302 determines that there is not enough power resources (the disk drive consumed 3 units of power leaving only 2 units of power) for the controller card alternative. Model 302 returns an unsuccessful return code to Engine 304.

At this point, Engine 304 determines (via the plan function - entry 528 of execution stack 504) that there are no untried alternatives for the power choicePoint (search stack 502, entry 552). Processing returns to processNextChoicePoint (execution stack 504, entry 527). In processNextChoicePoint (entry 527), it is determined that none of the choicePoint's alternatives were viable. The target choicePoint is identified. The target choicePoint is the slot choicePoint (entry 549), since it contains an untried alternative (i.e., a second slot). A revert function (see subsequent sample code section and FIG. 6) is called to undo the modifications associated with each choicePoint that occurred after the target choicePoint are undone.

The execution state is reverted when the processNextChoicePoint (execution stack 504, entry 527) throws a failure exception. The failure exception cannot be caught by the plan function associated with the slot choicePoint, since it has already been popped off of execution stack 504. The functions associated with the slot (entries 519–521) were popped off of execution stack 504 when the slot requirement was satisfied. The plan occurrence in entry 520 is not available to catch the failure exception thrown by Model 302. Therefore, the backtracking performed by Engine 304 results in reverting past the target choicePoint (i.e., the slot choicePoint-entry 549 of search stack 502). The next catch point is located in the plan function represented by execution stack 504, entry 520.

Because Engine 304 backtracked to a point in execution prior to the target choicePoint, Engine 304 initiates re-execution. A rerunning function (see subsequent section containing sample code) is used to determine whether re-execution mode is still needed. The rerunning function tests whether the current choicePoint is not the last choicePoint and either the next choicePoint is not the last choicePoint or the last choicePoint has already begun processing. Since the controller choicePoint is not the last choicePoint and testing has already begun on the last choicePoint (i.e., the slot choicePoint) has begun, the rerunning function returns a true value and re-execution mode continues.

Referring to FIG. 4A, at step 408 of FIG. 4A, Engine 304 identifies the same alternative (i.e., the controller card that needs 3 units of power) as the next alternative. The section entitled "Embodiments of Alternative Processing Methods" illustrates nextGoal code that can be used to identify the next alternative at step 408.

Engine 304 transfers control to Model 302 with the same controller card alternative. Entries 522–525 are invoked again and added to execution stack 504 to select a slot for the controller card. When Model 302 requests Engine 304 to make a slot choicePoint (in the requires invocation represented by entry 522 of execution stack 504), Engine 304 does not create a new choicePoint, since Model 302 is in re-execution mode. Instead, Engine 302 compares the alternatives specified by Model 302 in its creation request with the alternatives associated with the existing slot choicePoint (entry 549 of search stack 502).

When Model 302 requests an alternative, the rerunning function is called to determine whether to continue re-execution mode. This time, the slot choicePoint is the last choicePoint. Thus, rerunning returns a false value and re-execution terminates. Since re-execution mode was terminated, Engine 304 returns the next alternative slot for the slot choicePoint (search stack 502, entry 549). Model 302 successfully satisfies the slot requirement with the new slot alternative and requests a data state modification to store the slot selection. Engine 304 stores the modification, since re-execution mode has been discontinued. The entries associated with the requires, processNextChoicePoint, plan and satisfy functions (entries 522–525) are popped from execution stack 504.

When an attempt is made by Model 302 to satisfy the power requirement (entries 526–529), processing fails again (i.e., the power requirements for the selected controller card are too great for the system's power supply). Model 302 returns an unsuccessful code to Engine 304 (e.g., at 414). Since there are no more slot alternatives, plan (the occurrence represented by entry 528 of execution stack 504) returns with a successful code. The processNextChoicePoint (execution stack 504, entry 527) identifies the target choicePoint and calls a revert function to restore the data state and throws a failure exception to revert the control state back to the Controller choicePoint. The failure exception is caught by the Controller choicePoint's associated plan function (entry 520 of execution stack 504).

Since the controller card is both the current choicePoint and the last choicePoint, there is no need to enter re-execution mode. Plan transfers control to Model 302 with the next controller alternative to Model 302. Assume, for the sake of this example, that this controller card alternative requires 2 units of power.

Entries 522–526 are created as the requires, processNextChoicePoint, Plan and satisfy functions are called to satisfy the slot requirement. The slot requirement is satisfied and entries 522–526 are removed from execution stack 504. Entries 526–529 are created as the requires, processNextChoicePoint, Plan and Satisfy functions are invoked to satisfy the power requirement. Since this controller card requires 2 units of power, the power requirement is successful. Entries 526–529 are removed from execution stack 504.

Because the slot and power requirements have been satisfied, the function represented by entries 517–522 in execution stack 504 that installed the controller card end normally. Similarly, since the bay, power, slot and controller card requirements of the disk drive were successfully satisfied, the functions represented in entries 506–508 end normally. The search program ends successfully after identifying a configuration that satisfied the install disk drive request.

ProcessNextChoicePoint

Figure 6:
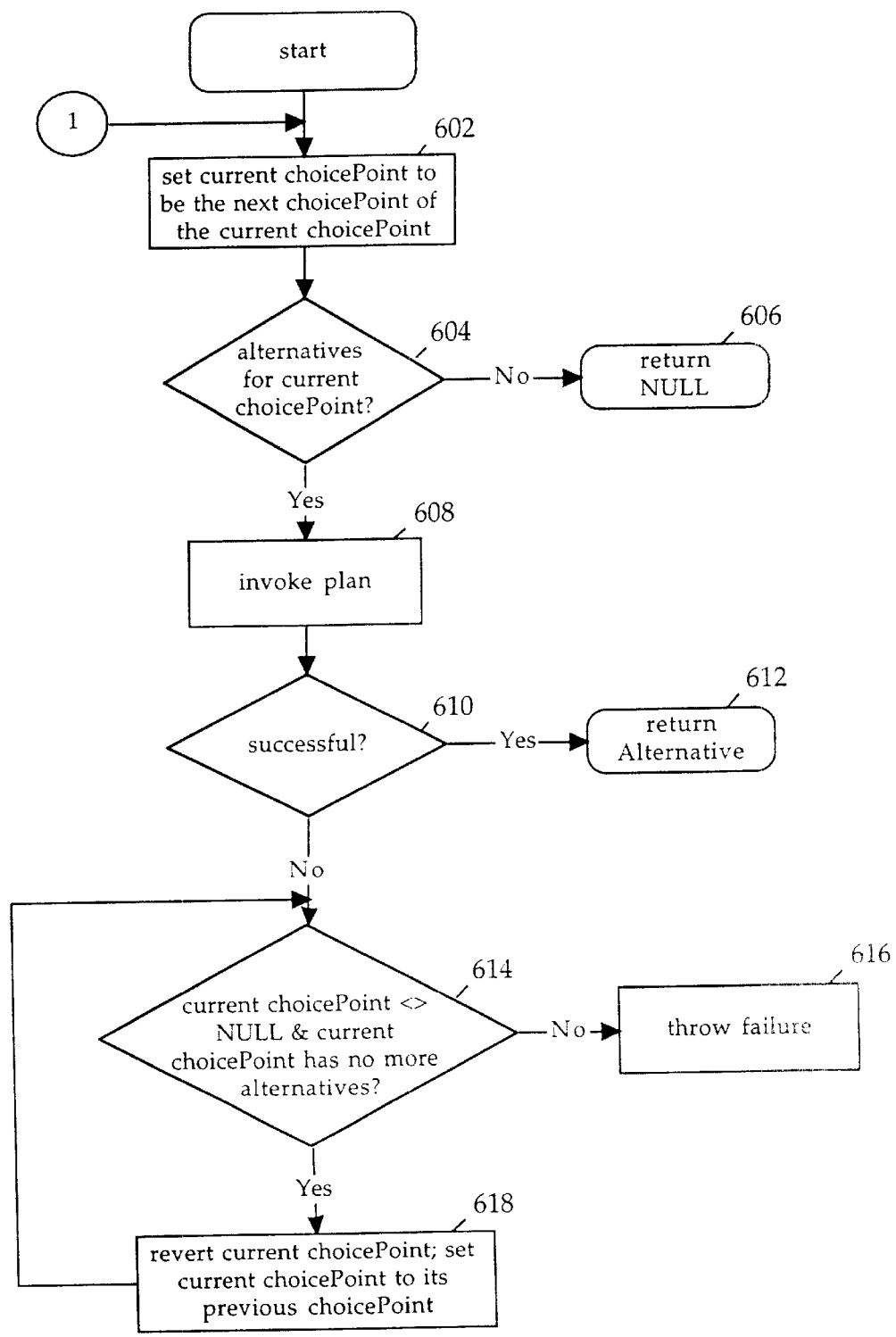
FIG. 6 provides a process flow for the processNextChoicePoint and fail functions according to an embodiment of the invention.

In the configuration example above, a choicePoint is process using the processNextChoicePoint function. The processNextChoicePoint function determines whether the choicePoint was successfully processed. If processing is unsuccessful, processNextChoicePoint calls a fail function (see subsequent sample code section) to identify and return to the target choicePoint. FIG. 6 provides a process flow for the processNextChoicePoint and fail functions according to an embodiment of the invention. The section entitled "Embodiment of processNextChoicePoint Method" provides an example of program code for implementing the processNextChoicePoint function.

At step 602, the next choicePoint becomes the current choicePoint. At step 604 (i.e., "alternatives for current choicePoint?"), a determination is made whether the current choicePoint has alternatives. If not, the processNextChoicePoint function returns at step 606. If so, processing continues at step 608 to call the plan function to process the current choicePoint's alternatives.

At step 610 (i.e., "successful?"), a determination is made whether Model 302 was successful in identifying an alternative. If so, processing continues at step 612 to return the alternative. If not, processing continues at step 614. Steps 614, 616, and 618 process a failed attempt to select an alternative of the current choicePoint (see the fail method in subsequent sample code section).

At step 614 (i.e., "current choicePoint < > NULL & current choicePoint has no more alternatives?"), a determination is made whether the current choicePoint is the target choicePoint. If the current choicePoint is the target choicePoint, processing continues at step 616 to throw a failure exception to backtrack in execution stack 504. If the current choicePoint is not the target choicePoint, processing continues at step 618 to revert the modifications associated with the current choicePoint and establish the current choicePoint's previous choicePoint as the current choicePoint. Steps 614 and 618 are executed until the target choicePoint is found. Once the target choicePoint is found or it is determined that there are no more choicePoints, processing continues at step 616 to restore the control state.

Reversion Process Flow

Figure 7:
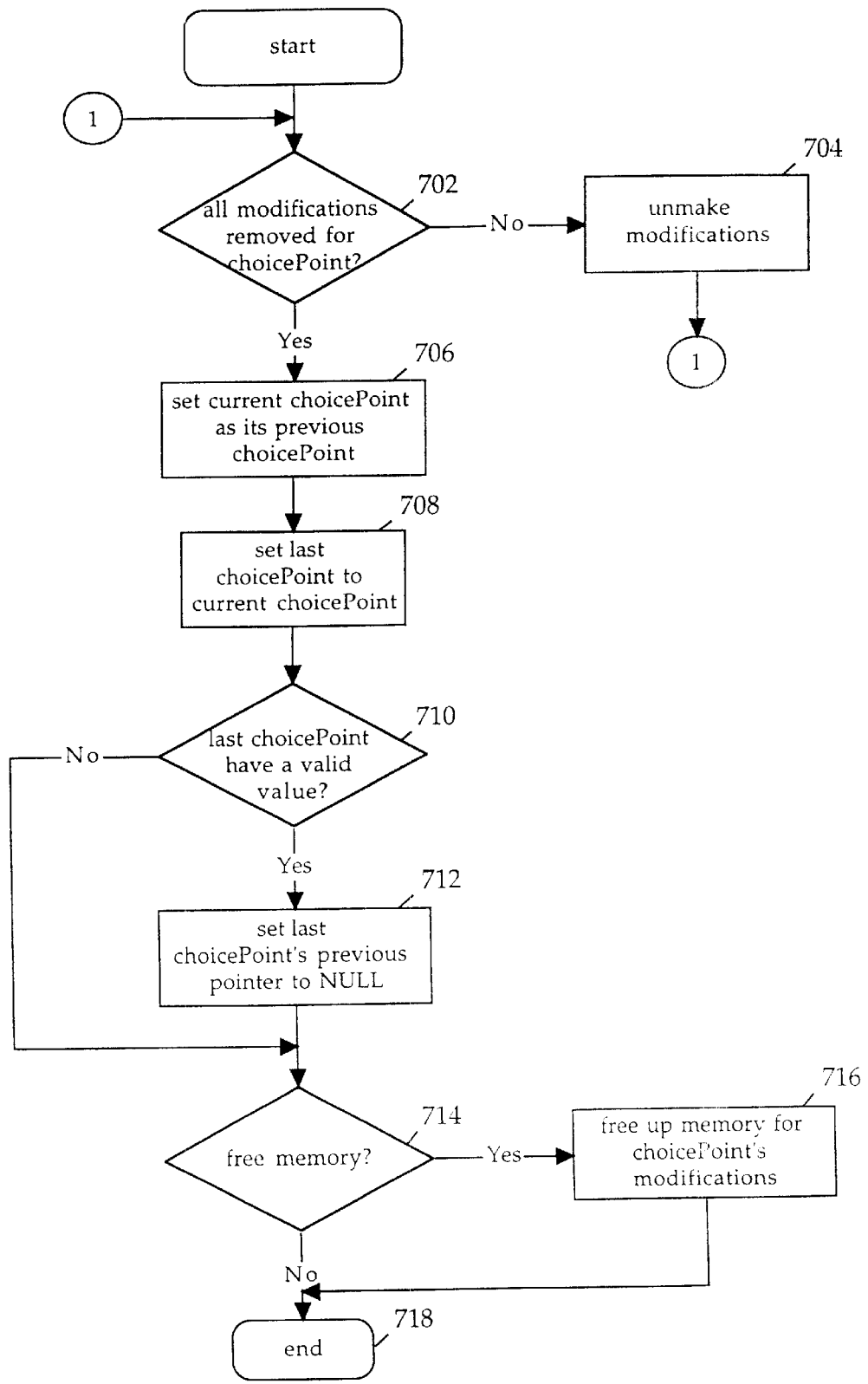
FIG. 7 provides a revert process flow according to an embodiment of the invention.

As discussed above, if Model 302 is unsuccessful selecting an alternative, Engine 304 reverts the data state. FIG. 7 provides a revert process flow according to an embodiment of the invention. The section entitled "Embodiments of Revert Methods" provides sample program code for reverting the data state.

A determination is made, at step 702 (i.e., "all modifications removed for choicePoint?"), whether the modifications associated with the choicePoint have been removed from the configuration. If not, processing continues at step 704 to unmake the modifications. If all of the choicePoint's modifications have been undone, processing continues at step 706. At step 706, the current choicePoint is reset to be the current choicePoint's previous choicePoint. The current choicePoint is then identified as the last choicePoint at step 708.

If it is determined at step 710 (i.e., "last choicePoint have a valid value?"), that there is a valid last choicePoint, processing continues at step 712 to set the previous pointer of the last choicePoint to NULL. If not, processing continues at step 714.

A determination is made at step 714 (i.e., "free memory?") whether the memory used to store Modifications and choicePoints should be deallocated depending on the context. For instance, when the choicePoints and Modifications occurred between the catch point and the target choicePoint and will therefore be needed during the re-execution process, they are not freed. If memory is not to be deallocated, processing continues at step 716 to free up the memory. Modifications can be stored in an object. In this case, the Modification objects associated with the removed choicePoint are deleted. Processing ends at step 718. If it is determined at step 714 that memory is not being deallocated, processing continues at step 718.

choicePoint Creation and Verification

Figure 8:
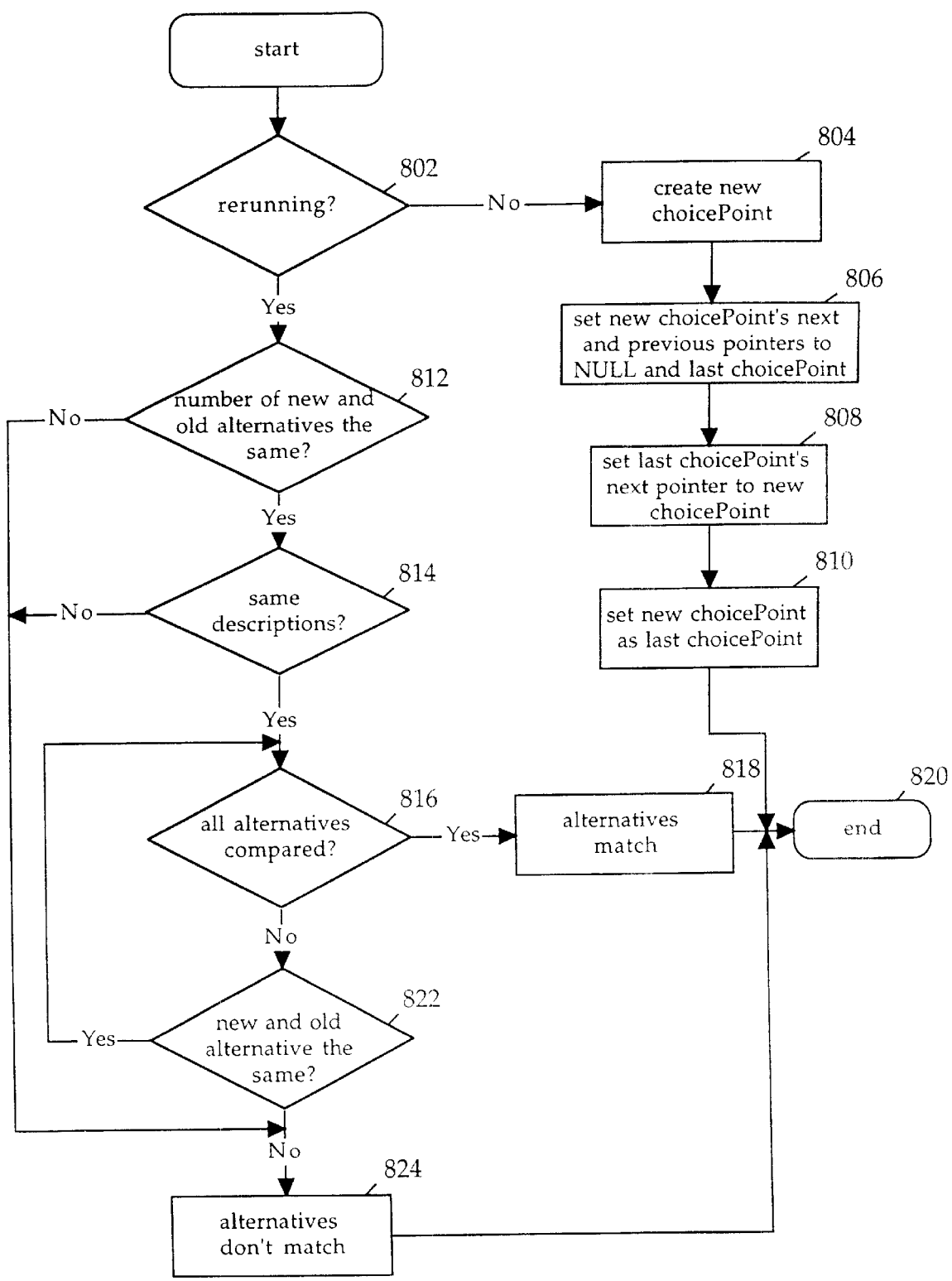
FIG. 8 provides a choicePoint creation and verification process flow according to an embodiment of the invention.

When Model 302 encounters a decision point, it identifies the alternatives available at the decision point. Model 302 asks Engine 304 to create a choicePoint and identifies the alternatives for the choicePoint. If execution is in normal mode, Engine 304 creates the choicePoint. However, if execution is in re-execution mode (such as when Engine 304 backtracked past the target choicePoint), Engine 304 does not create a duplicate choicePoint. In re-execution mode, the execution or control state is being recreated, but the data state Modifications and choicePoint tree already exist. Therefore, Engine 304 verifies that the requested choicePoint has the same properties as the previously created choicePoint. FIG. 8 provides a choicePoint creation and verification process flow according to an embodiment of the invention.

In this embodiment, a choicePoint's alternatives are processed to find a viable alternative. A choicePoint's alternatives can be explicitly enumerated, or a choicePoint's alternatives can be specified in an abstract manner. For example, if Model 302 is searching for a valid configuration of a system comprised of components, a choicePoint can be searching for a viable alternative for one of the components. The alternatives can explicitly enumerate all of the possible components that can then be examined to find a viable component. Another approach is to specify the alternative(s) abstractly by indicating a component type and whether the component can be an existing component or a new component. In this way, Model 302 can choose from a set of existing components of that type, or simply create a new component of that type.

At step 802 (i.e., "rerunning?"), a determination is made whether execution is no normal or re-execution mode. As discussed above, the rerunning function (see subsequent sample code section) tests whether the current choicePoint is not the last choicePoint and either the next choicePoint is not the last choicePoint or the last choicePoint has already begun processing.

If it is determined that execution is currently in normal mode, processing continues at step 804 to create a new choicePoint using the alternatives provided by Model 302. At step 806, previous and next pointers for the new choicePoint are set. The choicePoint created just prior to this choicePoint is identified as the previous choicePoint. Since the next choicePoint is not known, the next pointer is set to NULL. The last choicePoint's next pointer is set to the new choicePoint at step 808. For example, when entry 554 of search stack 502 of FIG. 5 is created, its previous pointer is set to point to the slot choicePoint (entry 549 of search stack 502). The next pointer for power choicePoint (search stack 502, entry 554) is set to NULL. The next choicePoint of the slot choicePoint (search stack 502, entry 554) is set to point to the power choicePoint (search stack 502, entry 554). At step 810, the new choicePoint is identified as the last choicePoint in the search stack. Processing ends at step 820.

If it is determined (at step 802) that execution is currently in re-execution mode, processing continues at step 812. In re-execution mode, Engine 304 verifies that the requested choicePoint corresponds with the existing choicePoint instead of creating a new choicePoint. At step 812 (i.e., "number of new and old alternatives the same?"), a determination is made whether the number of alternatives specified in the create request is the same as the number of the existing choicePoint's alternatives. If not, processing continues at step 824 to indicate that there is no match and ends at step 820.

If the number of alternatives is the same, processing continues at step 814. A description can be specified for a choicePoint. At step 814 (i.e., "same descriptions?"), a determination is made whether the new and existing choicePoints have the same description. If not, processing continues at step 824 to indicate that there is no match and ends at step 820. If so, processing continues at step 816 (i.e., all alternatives compared?") to determine whether all of the choicePoints alternatives have been compared. If so, processing continues at step 818 to indicate that the choicePoints match and processing ends at step 820.

If it is determined (at step 816) that all of the alternatives have not been compared, processing continues to compare the choicePoints' alternatives. At step 822 (i.e., new and old alternative the same?"), a determination is made whether the two choicePoints have the same alternative. If not, processing continues at step 824 to indicate that the choicePoints do not match and the examination ends at step 820. If so, processing continues at step 822 to process any remaining alternatives.

Data State Modifications

Figure 9:
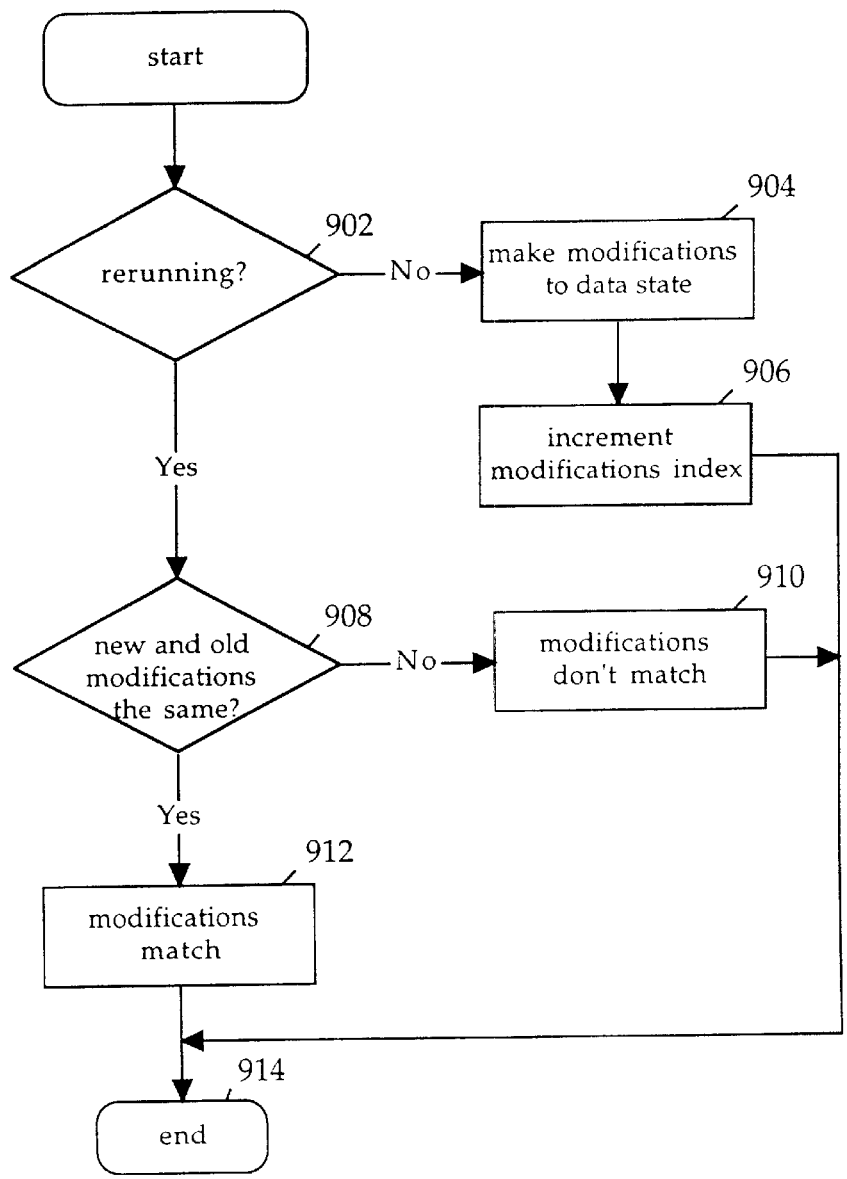
FIG. 9 provides a data state modification process flow according to an embodiment of the invention.

To mark a change in the search data state, Model 302 requests Engine 304 to make a modification. In re-execution mode, a request by Model 302 to make a modification (i.e., change the data state) causes Engine 304 to verify the new data state changes with the existing data state. That is, in normal mode, Engine 304 makes the modification. In re-execution mode, Engine 304 verifies the modification with the existing modification. FIG. 9 provides a data state modification process flow according to an embodiment of the invention.

Step 902 (i.e., "rerunning?") determines the mode of execution. If it is normal mode, processing continues at step 904 to make the modifications to the data state. At step 906 an index into the modifications is incremented. Processing ends at step 914.

It is determined (at step 902) that execution is in re-execution mode, processing continues at step 908. At step 908 (i.e., "new or old modifications the same?"), a determination is made whether the new modifications are the same as the old modifications. If not, processing continues at step 910 to indicate that the modifications do not match and processing ends at step 914. If the modifications match, processing continues at step 912 to indicate that the modifications match and processing ends at step 914.

Resource Allocation and Deallocation

When the execution state is restored, it is important to restore the state of the resources that existed at that point in the execution. If the expected resource state does not exist, a function can access an area of memory that has been deallocated, for example. This can result in processing invalid data that exists in the deallocated memory.

The technique of throwing an exception to revert the execution stack to a-common point between the target state and the failure state results in the deallocation of resources that are not in a shared part of the stack. Re-execution ensures that the deallocated resources are re-allocated. Thus, there is synchronization of the execution state and its expected resource state.

Figure 10:
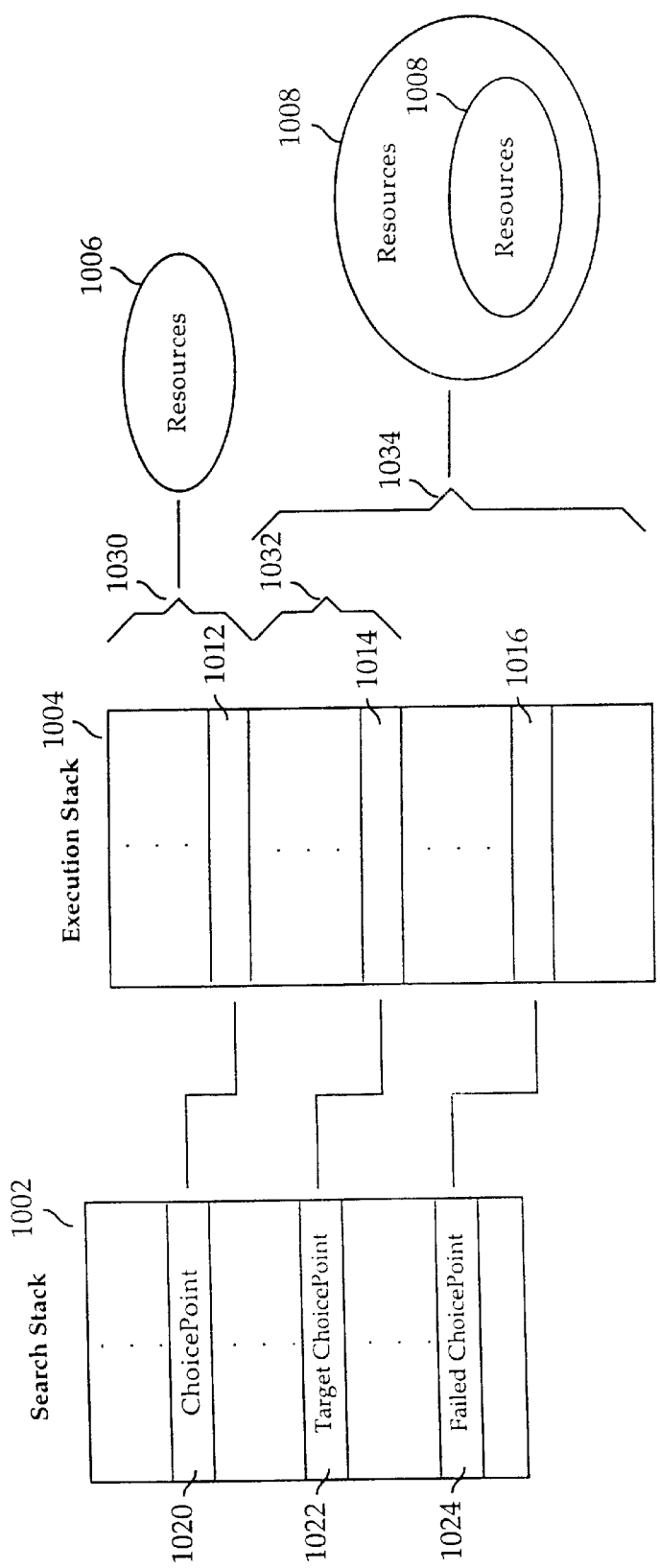
FIG. 10 illustrates resource allocation and deallocation according to an embodiment of the invention.

FIG. 10 illustrates resource allocation and deallocation according to an embodiment of the invention. During execution of entry 1016 of execution stack 1004, an exception is thrown. The exception is thrown as a result of a failure that occurred while processing the choicePoint represented by entry 1024 of search stack 1002. Entry 1022 of search stack 1002 represents the target choicePoint. Thus, execution should revert to a function that processes the target choice-Point (e.g., function 1014). However, in this example, the function (represented by entry 1014 of execution stack 1004) has been popped off execution stack 1004. Instead, the exception is caught in entry 1012 of execution stack 1004.

Portion 1030 of execution stack 1004 represents the portion of execution stack 1004 that is common between the failed choicePoint and the target choicePoint. During the processing of the exception, however, portion 1034 is popped off execution stack 1004.

Resources 1006 are allocated for portion 1030 of execution stack 1004. Resources 1008A are allocated for portion 1034 of execution stack 1004 including resources 1008B allocated for portion 1032 of execution stack 1004. During exception handling, resources 1008A and 1008B are deallocated.

Re-execution is initiated to revert to the target choice-Point. During re-execution, portion 1032 of execution stack 1004 is regenerated. Further, resources 1008B are allocated. Thus, when execution resumes at the target choicePoint (search stack 1002, entry 1022), the expected resources are allocated and the resource state is synchronized with the execution state.

Hardware Embodiment

Figure 11:
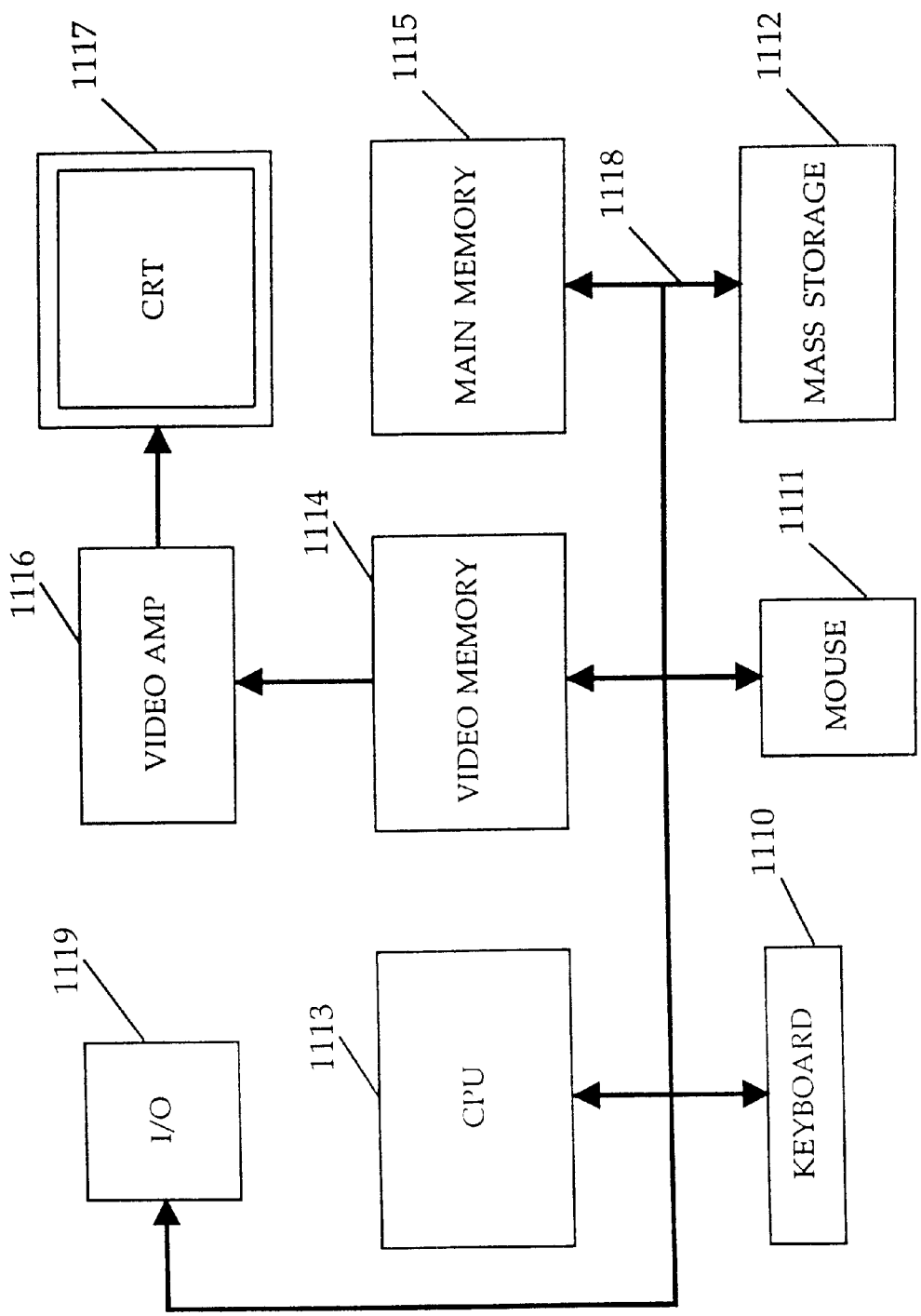
FIG. 11 provides an example of a general purpose computer that can be used in an embodiment of the invention.

The present invention can be implemented on a general purpose computer such as illustrated in FIG. 11. A keyboard 1110 and mouse 1111 are coupled to a bi-directional system bus 1118. The keyboard and mouse are for introducing user input to the computer system and communicating that user input to CPU 1113. The computer system of FIG. 11 also includes a video memory 1114, main memory 1115 and mass storage 1112, all coupled to bi-directional system bus 1118 along with keyboard 1110, mouse 1111 and CPU 1113. The mass storage 1112 may include both fixed and removable media, such as magnetic, optical or magnetic optical storage systems or any other available mass storage technology. Bus 1118 may contain, for example, 32 address lines for addressing video memory 1114 or main memory 1115. The system bus 1118 also includes, for example, a 32-bit DATA bus for transferring DATA between and among the components, such as CPU 1113, main memory 1115, video memory 1114 and mass storage 1112. Alternatively, multiplex DATA/address lines may be used instead of separate DATA and address lines.

In the preferred embodiment of this invention, the CPU 1113 is a 32-bit microprocessor manufactured by Motorola, such as the 680x0 or Power PC processor or a microprocessor manufactured by Intel, such as the 80x86, or Pentium processor. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable means. This circuitry converts pixel DATA stored in video memory 1114 to a raster signal suitable for use by monitor 1117. Monitor 1117 is a type of monitor suitable for displaying graphic images.

The computer system described above is for purposes of example only. The present invention may be implemented in any type of computer system or programming or processing environment.

Embodiments of Plan Method with Catch Block
```
Goal* CCPlanner::plan( )
{
  // Remember the current choicePoint for catch choice-
     Point* thisChoicePoint=currentChoicePoint( );
  for (Goal* goal=nextGoal( ); goal; goal=nextGoal( ),
  {
    try
    {
      if (CCP→tracing ( ),
         Trans<<CCP<<"Trying               to
         satisfy"<<*goal<<endl;
      _choicesExplored++;
      if(goal→breakAt( )  ||currentChoicePoint(
         )→breakAt( ))
      DebugBreak( );
      if (goal→satisfy( ))
         if (CCP→tracing( ))
```

```
      Trans<<CCP<<*goal<<"succeeded"<<endl;
      return(goal);
    }
  //should it throw failure if it returns 0?
  }
  catch (Failure)
  {
    //If currentChoicePoint (the target for the throw) is
    //NULL, then we are all finished and thisChoice-
    Point has
    //already been cleaned up, just quit.
    if (currentChoicePoint( )==NULL) throw(Failure(
      ));
    else
    {
      //  Trans<<CCP<<"trying to catch
        in"<<*thisChoicePoint<<endl;
      if (!currentChoicePoint( )->prevInList
        (thisChoicePoint))
      {
        if (CCP->tracing( ))
         Trans<<CCP<<"Rethrowing"<<endl;
        throw(Failure( ));
      }
      //Want these revertions to actually delete the
        modifications
      currentChoicePoint( )->revert(true);
      while (currentChoicePoint( ) !=thisChoicePoint)
      {
        if(targetChoicePoint( ) && currentChoicePoint(
          )==targetChoicePoint( ))
        {
          Trans<<CCP<<"Reverting       past
            target"<<*targetChoicePoint( )<<"in order to
            restore control state"<<endl;
        }
        CCP->currentChoicePoint(currentChoicePoint(
          )->prev( ));
        currentChoicePoint( )->revert( );
      }
      if (CCP->tracing( ))
      Trans<<CCP.<<"rerunning
        from"<<*currentChoicePoint( )<<endl;
      }
    }
  }
  if (CCP->tracing( ))
  Trans<<CCP<<"failure"<<endl;
  return(NULL);
}

Embodiments Alternative Processing Methods
Goal* CCPlanner::nextGoal( )
{
  if (rerunning( ))
    return(currentChoicePoint( )->currentAlternative( ));
  else
    return(currentChoicePoint( )->getNextAlternative( ));
}
Goal* choicePoint::getNextAlternative( )
{
  if (_indexAlternatives <_alternatives.size( ))
  {
    if(CCP->debugging( ))
      (currentAlternative( )?currentAlternative(
        ):_alternatives[0])->old(true);
    _indexAlternatives++;
    return(currentAlternative( ));
  }
  else
    return(NULL);
}
Goal* currentAlternative( ) const{return
  _indexAlternatives ?
  _alternatives[_indexAlternatives-1]: NULL; }
bool hasBegun( ) const {return (_indexAlternatives!=0);}
bool hope( ) const {return(currentChoicePoint(
  )->hasAlternatives( ));}
bool hasAlternatives( ) const {return((!_disable) &&
  (_indexAlternatives<_alternatives.size( )));}
void CCPlanner::postAlternatives(const GoalVector& 1,
  const char* desc)
{
  if (rerunning( ))
  {
    if (currentChoicePoint( )->next( )->verifyAlternatives
      (1) && tracing( ))
    {
      if (CCP->tracing( ))
        Trans<<CCP<<"Alternatives match"<<endl;
    }
    else
    {
      if (CCP->tracing( ))
        Trans<<CCP<<"Warning: Alternatives don't
        match!"<<endl;
    }
  }
  else
  {
    choicePoint*  temp=createChoicePoint(1,
      _lastChoicePoint, NULL, desc);
    _lastChoicePoint->next(temp);
    _lastChoicePoint temp;
  }
}

Embodiment of processNextChoicePoint Method
Goal* CCPlanner::processNextChoicePoint( )
{
  //Advance to next choicePoint
  CCP->currentChoicePoint(currentChoicePoint( )->next(
    ));
  if (!currentChoicePoint( ))
  {
    if (CCP->tracing( ))
      Trans<<CCP<<"processNextChoicePoint  called
      with no alternatives posted"<<endl;
    return(NULL);
  }
  Goal* g=plan( );
  if (!g)
    fail( );
  if(g->breakAt( ))
  if (CCP->tracing( ))
    Trans<<CCP<<"choosing"<<*g<<.endl;
  return(g);
}
bool truePredicate(void* t){ return(true);}
          Embodiment of Fail Method
void CCPlanner::fail( )
{
```

```
if (CCP->tracing( ))
   Trans<<CCP<<"fail"<<endl;
// Find target choicePoint and revert to it
choicePoint* lastSOCP=NULL;
while ((currentChoicePoint( ) !=NULL) && !hope( ))
{
   if(CCP->currentChoicePoint( )->disabled( ))
       lastSOCP CCP->currentChoicePoint( );
   revert( );
}
if(lastSOCP)
{
   solveOnceList( ) .erase(find_if(solveOnceList(
      ).begin( ),solveOnceList( ).end( ),
      CompareCP(lastSOCP)),solveOnceList( ).end( ));
}
throw(Failure( ));
}

Embodiments of Revert Methods
void CCPlanner::revert( )
{
   // Call revert on the choicePoint to undo modifications,
      etc.
   currentChoicePoint( )->revert( );
   // Patch up the current and last choicePoint pointers
   choicePoint* temp=currentChoicePoint( );
   CCP->currentChoicePoint(currentChoicePoint( )->prev(
      ));
   _lastChoicePoint=currentChoicePoint( );
   if (_lastChoicePoint)
   {
      _lastChoicePoint->next(NULL);
      // if debugging, then save oldCP
      if(CCP->debugging( ))
          currentChoicePoint( )->currentAlternative(
          )->oldCP(temp);
   }
   if (CCP->tracing( ))
       Trans<<CCP<<"out of choices for"<<*temp<<endl;
   pushManager(CCP->manager);
   if(!CCP->debugging( ))
      delete temp;
   popManager( );
}
void choicePoint::revert(bool fRemoveModifications, int
index)
{
   // Revert the modifications back to index.
   // The fRemoveModifications should never true if index
      is nonzero.
   // Get rid of the modifications if fRemoveModifications
      is true.
   // if searchdebugger is running don't free CP memory
   if(CCP->debugging( )) old(true);
   if(fRemoveModifications && !CCP->debugging( ))
      // free up all used memory for goals
      CCP->manager->resetToPointer(_stackPtr);
   if (CCP->tracing( ))
       Trans<<CCP<<"reverting"<<*this<<endl;
   for (int i=_modifications.size( )-1; i>=index; i—)
   {
      if (CCP->tracing( ))
         Trans<<CCP<<"unmaking"<<*_modifications[i]
         <<endl;
      _modifications[i]->unMake( );
      // We should actually remove modifications on the
         target
         ChoicePoint and leave them on the others
      if (fRemoveModifications) // (&& !CCP->debugging(
         ))
         delete _modifications[i];
   }
   if (fRemoveModifications) // && !CCP->debugging( ))
      _modifications.erase( modifications.begin( ),
         modifications.end( ));
   _indexModifications=index;
}

Modify and Rerunning Method Embodiments
void ChoicePoint::modify(Modification* m)
{
   // Trans<<"making"<<*m<<endl;
   // m->make( );
   if (CCP->rerunning( ))
   {
      // Verify that the modifications are identical
      _modifications[_indexModifications++]->make( );
      if (fullCompare(m, _modifications[_
         indexModifications-1]))
      {
         if (CCP->tracing( ))
            Trans<<CCP<<"Modification<<*m<<matches"<<endl;
      }
      else
      {
         if (CCP->tracing( ))
            Trans<<CCP<<"WARNING:
            Modification"<<*m<<"does not match!"<<endl;
      }
      delete m;
   }
   else
   {
      m->make( );
      _modifications.push_back(m);
      indexModifications++;
   }
}
bool rerunning( ) const
{
   return(currentChoicePoint( ) && currentChoicePoint( )
      _lastChoicePoint && (currentChoicePoint( )->next( )
      !=
      lastChoicePoint ||_lastChoicePoint->hasBegun( )));
}

Embodiments of Verification Methods
bool ChoicePoint::verifyAlternatives(const GoalVector& 1)
const
{
   if (1.size( ) !_alternatives.size( ))
       return false;
   bool success=true;
   for (int i=0; i <1.size( ); i++)
   {
```

```
        if (!(1[i]->compare(*_alternatives[i])))
            success=false;
        delete 1[i];
    }
    return true;
}
bool ChoicePoint::verifyAlternatives(int 1, const char* desc) const
{
    if (_alternatives.size( ) !=1)
        return false;
    if(desc==_description)
        return true;
    return !strcmp(desc, _description);
}
```

Thus, a method and apparatus for transparent backtracking has been provided.

What is claimed is:

1. A method of backtracking in a program executable in a memory medium of a computer system comprising a computer program written in a general purpose computer programming language comprising:

instantiating a choice point in an executable computer program in a memory medium, said choice point identifying a decision point in said program, at least one alternative choice being linked with said choice point;

preserving modifications to data in said program as defined at said choice point as a data state portion of part of said program's processing state;

specifying a catch point associated with a point of execution prior to said choice point as a control state portion of said program's processing state;

examining said choice point to find said at least one alternative choice;

traversing said choice point to evaluate the validity of said at least one alternative choice; and restoring said program to said processing state at said catch point associated with said choice point by throwing an exception to said catch point and undoing said modifications when said at least one alternative choice is invalid.

2. The method of claim 1 further comprising:

retaining said modifications to said data state aftere restoring said processing state.

3. The method of claim 2 further comprising:

utilizing said retained modifications for verifying said data state after restoring said processing state.

4. The method of claim 1 wherein said catch point is explicitly specified.

5. The method of claim 1 wherein said catch point is implicitly specified.

6. A method of backtracking in a program executable in a memory medium of a computer system comprising a computer program written in a general purpose computer programming language comprising:

identifying a target choice point in a decision tree of an executable computer program by traversing a search stack backwards for at least one choice point linked to at least one untried alternative choice;

preserving data state of said program as defined at said target choice point by storing modifications to said data values in a modification object;

specifying a catch point associated with a point of execution prior to said target choice point in said program;

examining said target choice point to find said at least one untried alternative choice;

traversing said target choice point to evaluate the validity of said at least one untried alternative choice;

throwing an exception to said catch point when said at least one untried alternative choice is invalid;

restoring said program data state using said modification object; and re-executing said program when said catch point is prior to said target choice point.

7. The method of claim 6 further comprising repeating from said identifying step on each of said at least one untried alternative choices.

8. The method of claim 6 further comprising:

retaining said modifications to said program data state after restoring said program data state.

9. The method of claim 8 retaining said modifications to said modifications to said program data state after restoring said program data state.

10. The method of claim 6 wherein said catch point is explicitly specified.

11. The method of claim 6 wherein said catch point is implicitly specified.

12. A transparent backtracking search system executable in a memory medium of a computer system comprising a computer program written in a general purpose computer programming language comprising:

a search system comprising:

a search stack residing in a memory medium of a computer system, said search stack comprising at least one choice point having a set of alternatives;

a model capable of examining said search stack to determine whether said set of alternatives are viable;

a means for inputting data; and a means for outputting the search result;

an execution stack coupled to said model storing the execution state of said search system and a plurality of catch points in said search system;

an engine coupled to said model and said execution stack;

a means for validating the viability of choices of said set of alternatives;

a means for reverting said search system to one of said plurality of catch points of said execution stack and reverting said search stack to said a least one choice point having at least one untried alternative.

13. The system of claim 12 wherein said search system is capable of determining the viability of alternative configurations of a computer system.

14. The system of claim 13 wherein said validating means can determine the viability of installing a particular component in said computer system.

15. The system of claim 13 wherein said validating means can choose a component from a set of components existing in said computer system.

16. The system of claim 12 wherein said validating means is not recursive.

17. The system of claim 12 further comprising a means for re-executing processing from said catch point to said at least one choice point when said catch point is prior to said choice point.

18. The system of claim 12 wherein said engine is capable of causing said model to recreate a portion of said search stack.

19. The system of claim 12 wherein a set of modifications are associated with said at least one choice point.

* * * * *